United States Patent
Mathur et al.

(10) Patent No.: US 12,474,181 B2
(45) Date of Patent: Nov. 18, 2025

(54) METHOD FOR GENERATING DIAGRAMMATIC REPRESENTATION OF AREA AND ELECTRONIC DEVICE THEREOF

(71) Applicant: Samsung Electronics Co., Ltd., Suwon-si (KR)

(72) Inventors: Aniroop Mathur, Noida (IN); Ankit Sharma, Noida (IN); Gurmanjeet Singh Sidhu, Noida (IN); Pradip Bepari, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 17/763,638

(22) PCT Filed: Sep. 24, 2020

(86) PCT No.: PCT/KR2020/013010
§ 371 (c)(1),
(2) Date: Mar. 24, 2022

(87) PCT Pub. No.: WO2021/060894
PCT Pub. Date: Apr. 1, 2021

(65) Prior Publication Data
US 2022/0299338 A1    Sep. 22, 2022

(30) Foreign Application Priority Data
Sep. 24, 2019 (IN) .............................. 201941038581

(51) Int. Cl.
*G01C 21/00* (2006.01)
*G01C 21/20* (2006.01)
(Continued)

(52) U.S. Cl.
CPC ......... *G01C 21/383* (2020.08); *G01C 21/005* (2013.01); *G01C 21/206* (2013.01);
(Continued)

(58) Field of Classification Search
None
See application file for complete search history.

(56) References Cited

U.S. PATENT DOCUMENTS 7,295,119 B2   11/2007  Rappaport et al.
7,620,613 B1   11/2009  Moore et al.
(Continued)

FOREIGN PATENT DOCUMENTS

JP    2014-533352 A    12/2014

OTHER PUBLICATIONS

Capobianco, Roberto, et al. "Automatic extraction of structural representations of environments." Intelligent Autonomous Systems 13: Proceedings of the 13th International Conference IAS-13. Springer International Publishing, 2016. (Year: 2016).*

(Continued)

*Primary Examiner* — Maria S Ayad

(57) ABSTRACT

This present disclosure provides a method for generating diagrammatic representation of an area. The method includes obtaining, by an electronic device (100), sensor data over a period of time of a plurality of locations of the area. Further, the method includes generating, by the electronic device (100), a heat map of the sensor data of each of the location of the area. Further, the method includes generating, by the electronic device (100), the diagrammatic representation of the area based on the heat map of the sensor data.

12 Claims, 23 Drawing Sheets

(51) Int. Cl.
*G06T 7/10* (2017.01)
*G06T 7/11* (2017.01)
*G06T 7/12* (2017.01)
*G06T 7/13* (2017.01)
*H04W 4/02* (2018.01)
*H04W 4/029* (2018.01)

(52) U.S. Cl.
CPC ..... *G01C 21/3804* (2020.08); *G01C 21/3848* (2020.08); *G01C 21/3859* (2020.08); *H04W 4/029* (2018.02); *G06T 7/10* (2017.01); *G06T 7/11* (2017.01); *G06T 7/12* (2017.01); *G06T 7/13* (2017.01); *H04W 4/02* (2013.01)

(56) References Cited

U.S. PATENT DOCUMENTS

| | | | |
|---|---|---|---|
| 8,306,348 B2* | 11/2012 | Cohen | G06T 5/94 348/222.1 |
| 8,320,939 B1* | 11/2012 | Vincent | G01C 21/206 709/224 |
| 8,825,388 B2 | 9/2014 | Khorashadi et al. | |
| 8,898,034 B2* | 11/2014 | Huang | G01C 17/38 702/150 |
| 9,307,368 B1 | 4/2016 | Bartlett | |
| 9,404,756 B2 | 8/2016 | Fong et al. | |
| 9,733,091 B2* | 8/2017 | Kordari | G01C 21/206 |
| 9,823,068 B2* | 11/2017 | Karvounis | G01C 5/06 |
| 9,823,078 B2* | 11/2017 | Esteve Balducci | G01C 21/206 |
| 9,846,053 B2 | 12/2017 | Schmidt et al. | |
| 9,939,814 B1 | 4/2018 | Bauer et al. | |
| 10,012,502 B2* | 7/2018 | Karvounis | G01C 5/00 |
| 10,111,197 B2* | 10/2018 | Ronen | G01S 5/02524 |
| 10,330,491 B2* | 6/2019 | Janardhanan | G01C 21/165 |
| 10,895,971 B2* | 1/2021 | Jones | G05B 15/02 |
| 2012/0072110 A1* | 3/2012 | Venkatraman | G01C 21/08 701/434 |
| 2013/0079033 A1 | 3/2013 | Gupta et al. | |
| 2013/0116968 A1* | 5/2013 | Wirola | H04W 64/00 702/150 |
| 2014/0278060 A1* | 9/2014 | Kordari | G01C 21/383 701/422 |
| 2014/0283136 A1* | 9/2014 | Dougherty | H04W 64/00 726/29 |
| 2015/0235266 A1 | 8/2015 | Jain et al. | |
| 2017/0099353 A1* | 4/2017 | Arora | H04W 4/70 |
| 2018/0111274 A1 | 4/2018 | Seok et al. | |
| 2018/0188041 A1 | 7/2018 | Chen et al. | |
| 2018/0329617 A1* | 11/2018 | Jones | H04W 4/70 |
| 2018/0348023 A1 | 12/2018 | Klein et al. | |
| 2019/0236686 A1 | 8/2019 | Thompson et al. | |
| 2019/0304150 A1* | 10/2019 | Zweigle | G06T 7/521 |

OTHER PUBLICATIONS

Elhamshary, Moustafa, Moustafa Alzantot, and Moustafa Youssef. "JustWalk: A crowdsourcing approach for the automatic construction of indoor floorplans." IEEE Transactions on Mobile Computing 18.10 (2018): 2358-2371. (Year: 2018).*
International Search Report and Written Opinion of the International Searching Authority dated Jan. 15, 2021, in connection with International Application No. PCT/KR2020/013010, 10 pages.
Examination report dated May 23, 2021, in connection with Indian Application No. 201941038581, 7 pages.
Brush, et al., "Home Automation in the Wild: Challenges and Opportunities," Conference Paper, DBLP, May 2011, 11 pages.
Moorhead, "The Problem With Home Automation's Internet of Things (IoT)," Forbes Trusted b, Sep. 26, 2013, 5 pages.

* cited by examiner

[Fig. 1]
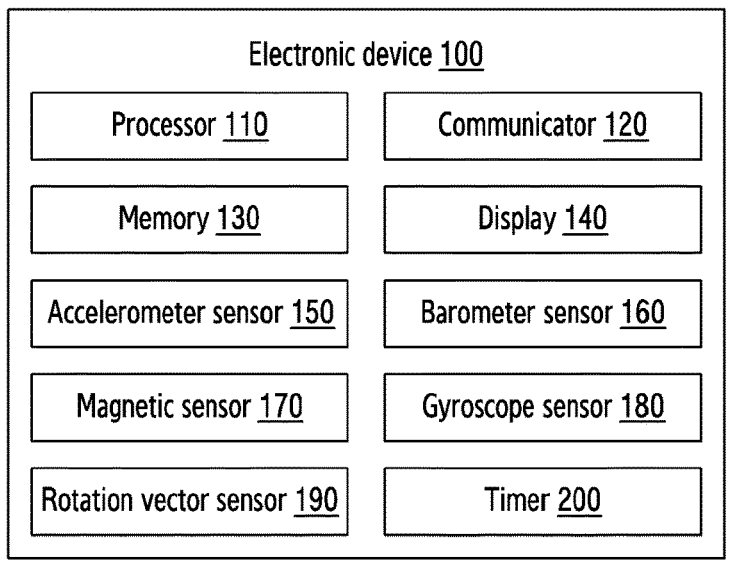
[Fig. 2]
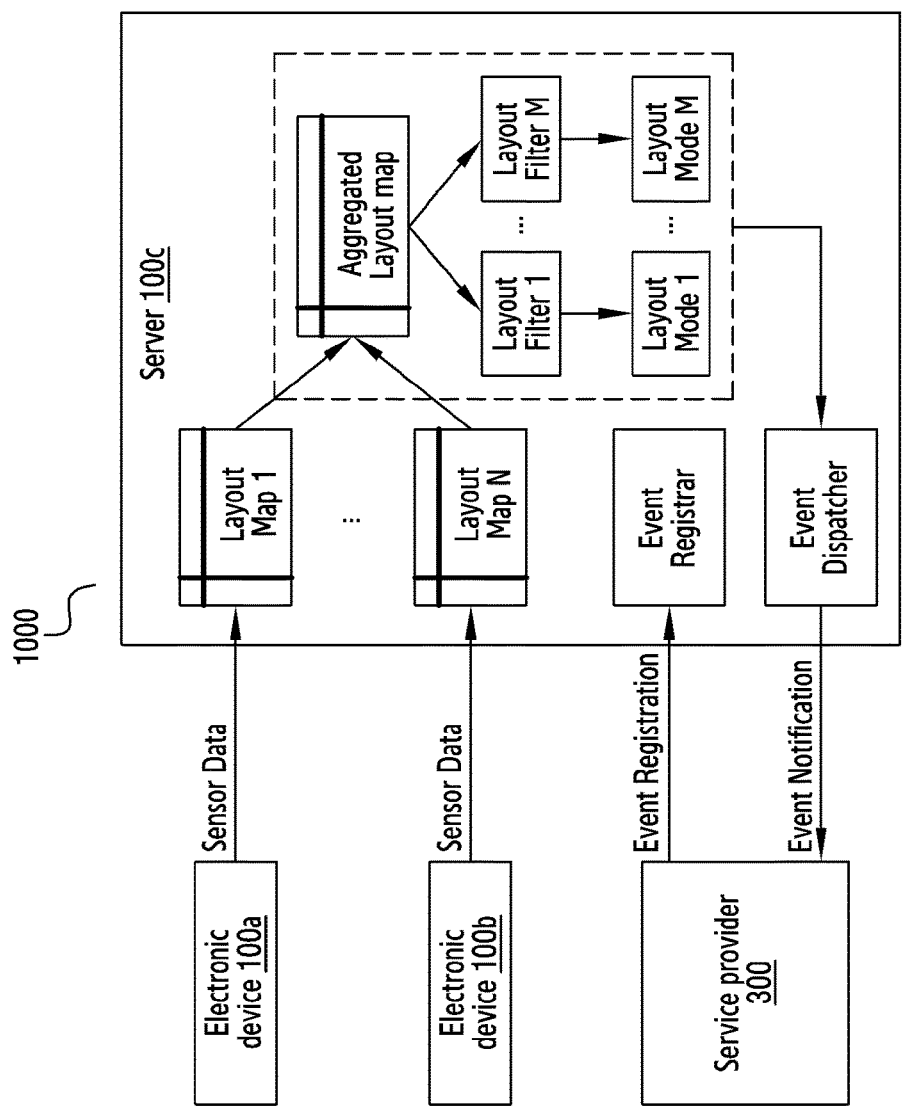

[Fig. 3]
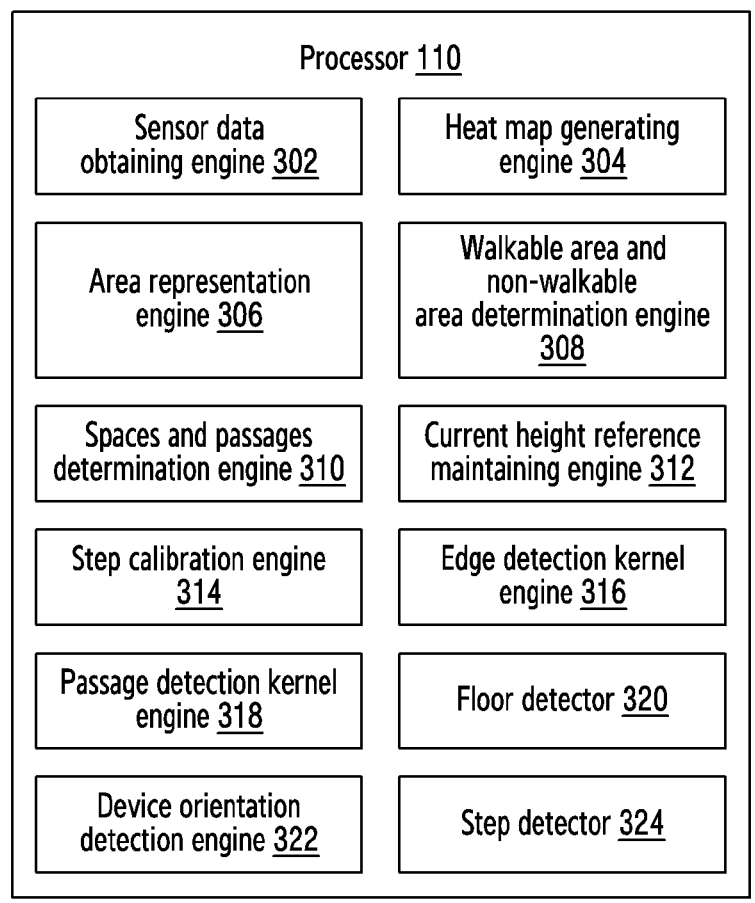

[Fig. 4]
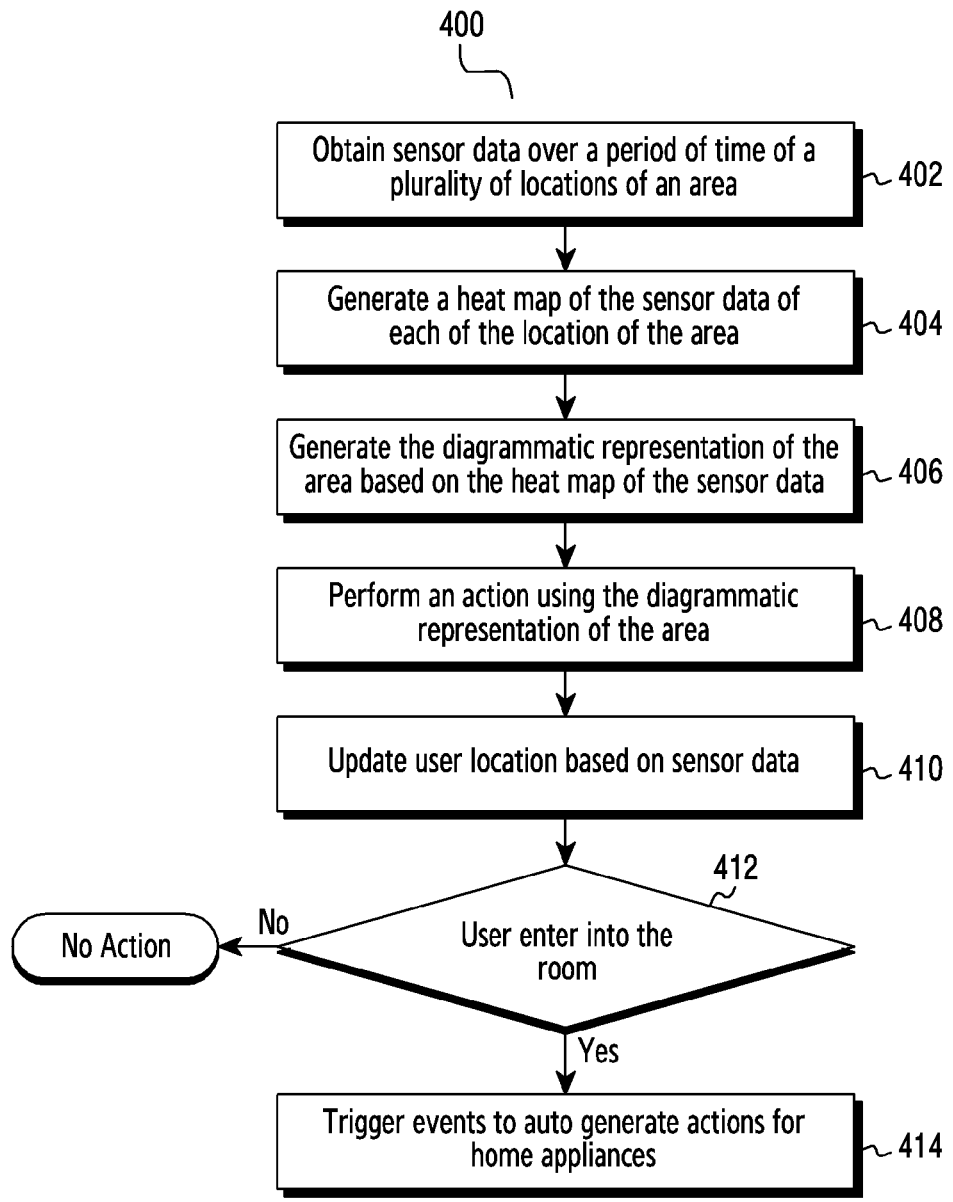

[Fig. 5A]
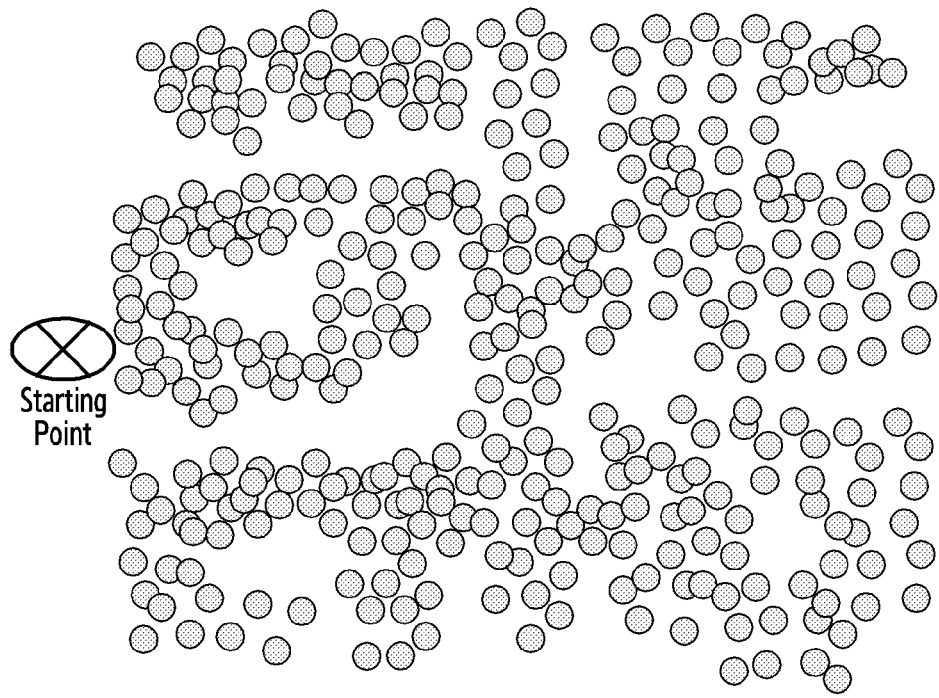

[Fig. 5B]
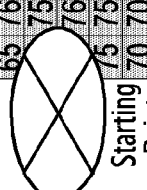
Starting Point

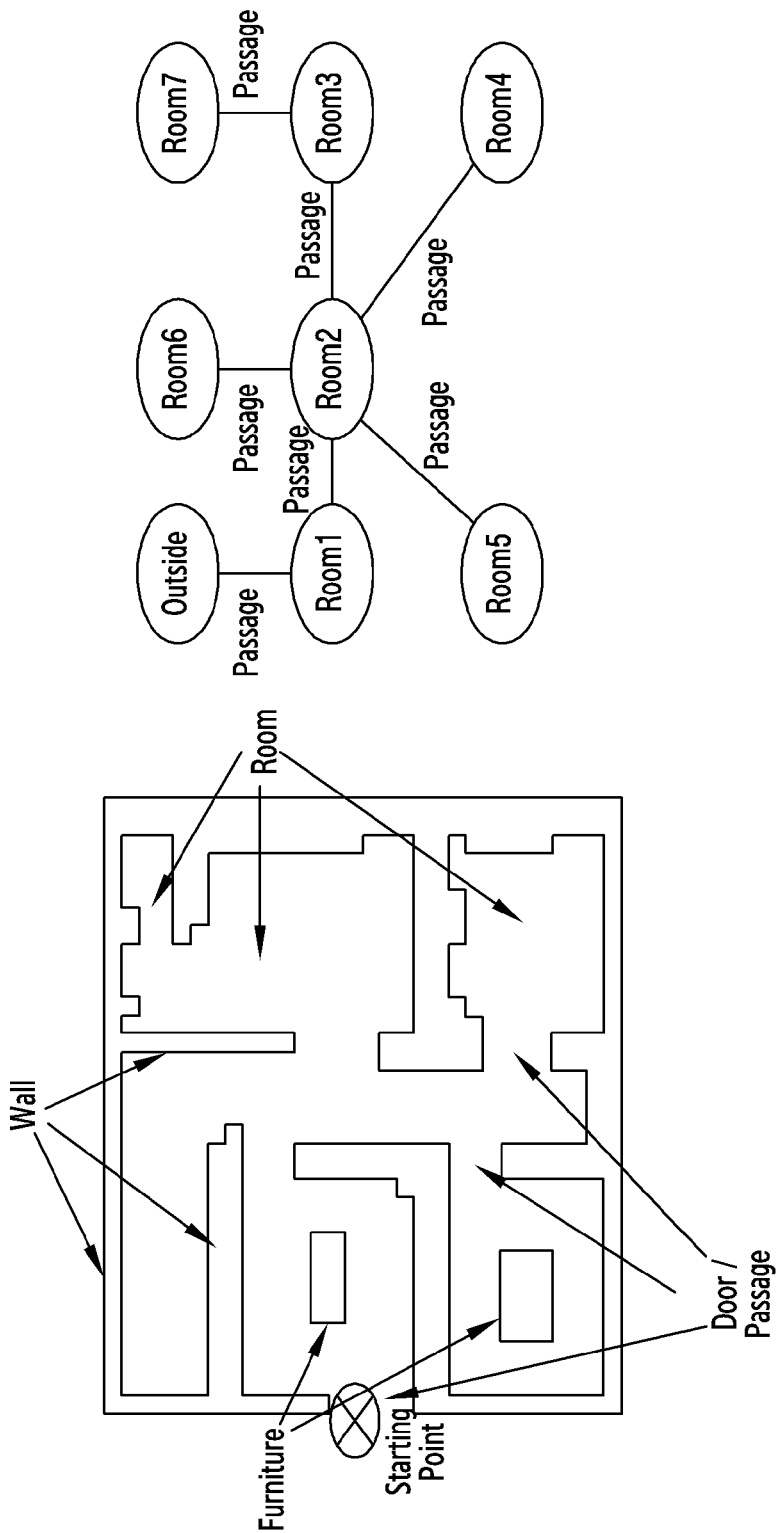
[Fig. 5C]

[Fig. 6A]
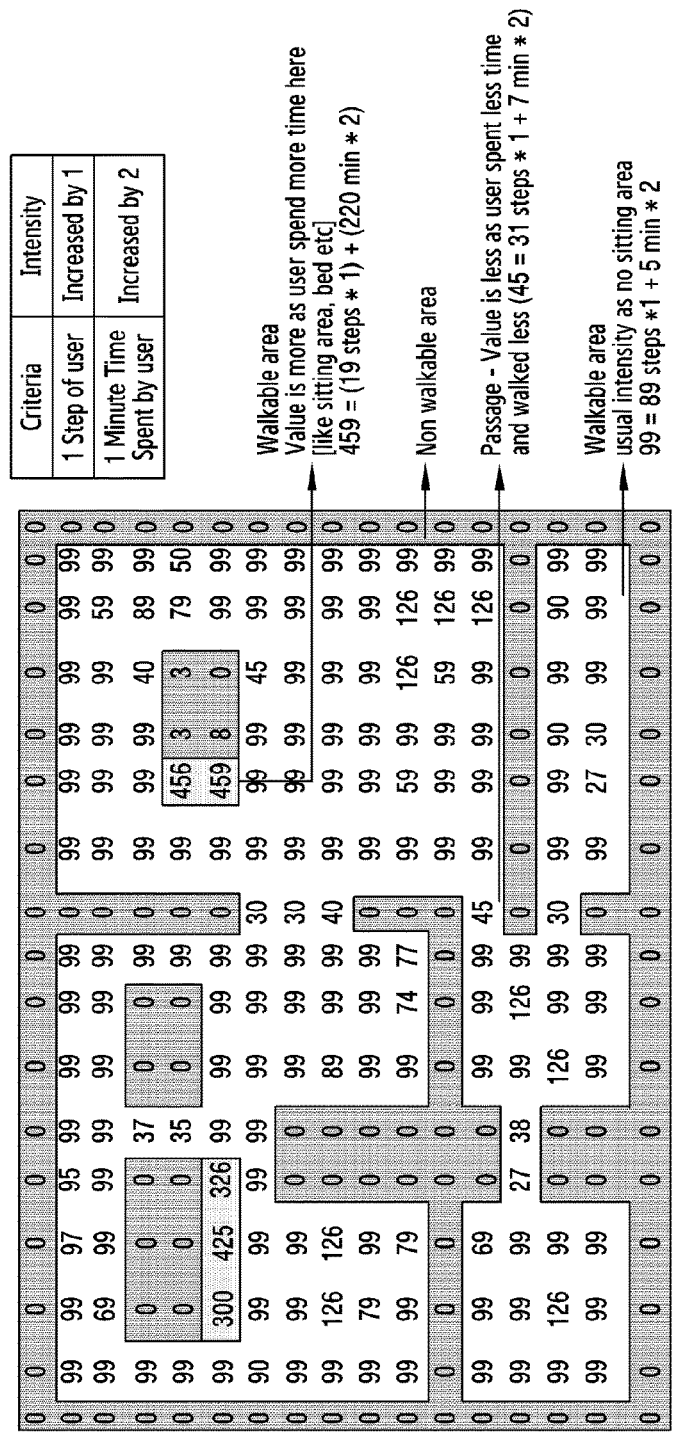
[Fig. 6B]
Edge detection Kernel Matrix
| -1 | 1 | -1 |
|----|----|----|
| -1 | 45 | -1 |
| -1 | 1 | -1 |

[Fig. 6C]
a)
| -1 | -1 | -1 |
|---|---|---|
| 2 | 2 | 2 |
| -1 | -1 | -1 |
b)
| -1 | 2 | -1 |
|---|---|---|
| -1 | 2 | -1 |
| -1 | 2 | -1 |
c)
| -1 | -1 | 2 |
|---|---|---|
| -1 | 2 | -1 |
| 2 | -1 | -1 |
d)
| 2 | -1 | -1 |
|---|---|---|
| -1 | 2 | -1 |
| -1 | -1 | 2 |
[Fig. 6D]
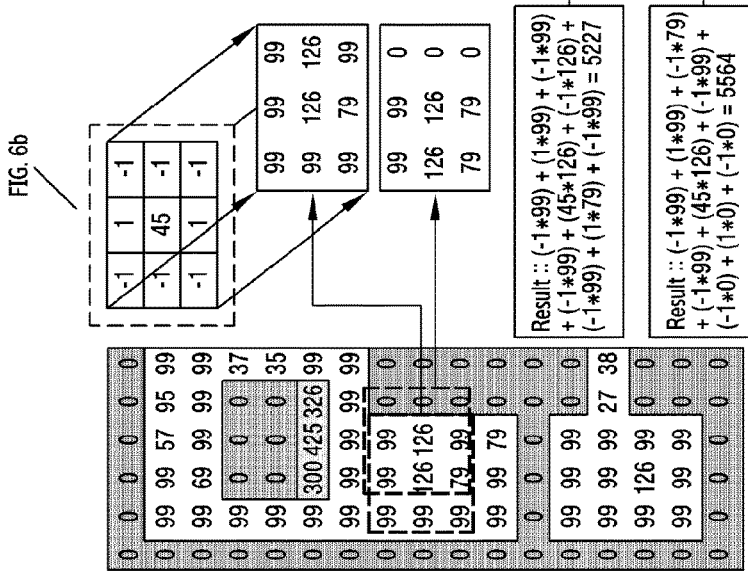

[Fig. 6E]

| 0 | 1 | 0 |
|---|---|---|
| 0 | 45 | 0 |
| 0 | 1 | 0 |

[Fig. 6F]

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 4554 | 4554 | 4554 | 4514 | 4554 | 4653 | 4604 | 2448 | 4604 | 4653 | 4653 | 4653 | 4653 | 4653 | 4653 | 198 | 4554 | 4554 | 0 |
| 0 | 4554 | 4554 | 4554 | 4594 | 2843 | 4143 | 3743 | 175 | 4633 | 4653 | 4653 | 4653 | 4680 | 5895 | 5796 | 216 | 4149 | 4545 | 0 |
| 0 | 4554 | 4554 | 4653 | 4557 | 1902 | 242 | 48 | 2124 | 4599 | 4653 | 4653 | 4680 | 5828 | 2880 | 4514 | 198 | 4080 | 4554 | 0 |
| 0 | 4554 | 4653 | 5010 | 21078 | 462 | 4562 | 4653 | 4653 | 4653 | 4653 | 4653 | 4653 | 2853 | 4554 | 189 | 4482 | 1440 | 4554 | 0 |
| 0 | 4653 | 4653 | 21210 | 5013 | 4653 | 4653 | 4653 | 4613 | 4613 | 4653 | 4554 | 198 | 198 | 4554 | 1314 | 4554 | 0 | 0 | 0 |
| 0 | 0 | 0 | 0 | 30 | 1380 | 1420 | 1830 | 40 | 0 | 45 | 2025 | 75 | 1350 | 30 | 0 | 0 | 0 | 0 | 0 |
| 0 | 4554 | 4554 | 4653 | 4653 | 4653 | 4653 | 4653 | 4631 | 3564 | 176 | 4554 | 4653 | 4554 | 0 | 0 | 0 | 0 | 0 | 0 |
| 0 | 4554 | 4554 | 4653 | 99 | 99 | 4643 | 4203 | 4628 | 3429 | 173 | 4581 | 5868 | 4554 | 0 | 0 | 0 | 0 | 0 | 0 |
| 0 | 4554 | 4591 | 1799 | 99 | 4589 | 4643 | 4554 | 4554 | 198 | 4554 | 4680 | 4680 | 4581 | 0 | 0 | 0 | 0 | 0 | 0 |
| 0 | 4550 | 326 | 1711 | 99 | 4781 | 99 | 0 | 38 | 1710 | 38 | 4554 | 5868 | 4554 | 0 | 0 | 0 | 0 | 0 | 0 |
| 0 | 4512 | 425 | 4769 | 4979 | 0 | 0 | 27 | 1215 | 27 | 0 | 4680 | 4581 | 0 | 0 | 0 | 0 | 0 | 0 | 0 |
| 0 | 2664 | 4374 | 19224 | 4854 | 4680 | 5848 | 3780 | 4534 | 148 | 4554 | 4623 | 5868 | 4554 | 0 | 0 | 0 | 0 | 0 | 0 |
| 0 | 4524 | 3204 | 13599 | 4248 | 4644 | 4653 | 4643 | 4554 | 198 | 4653 | 4653 | 4653 | 4554 | 0 | 0 | 0 | 0 | 0 | 0 |
| 0 | 4653 | 4653 | 300 | 4644 | 4653 | 5848 | 3654 | 198 | 4554 | 4680 | 5868 | 4581 | 0 | 0 | 0 | 0 | 0 | 0 | 0 |
| 0 | 4653 | 69 | 99 | 4644 | 4680 | 4660 | 4653 | 3780 | 4534 | 4554 | 4653 | 4653 | 4554 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

[Fig. 6G]
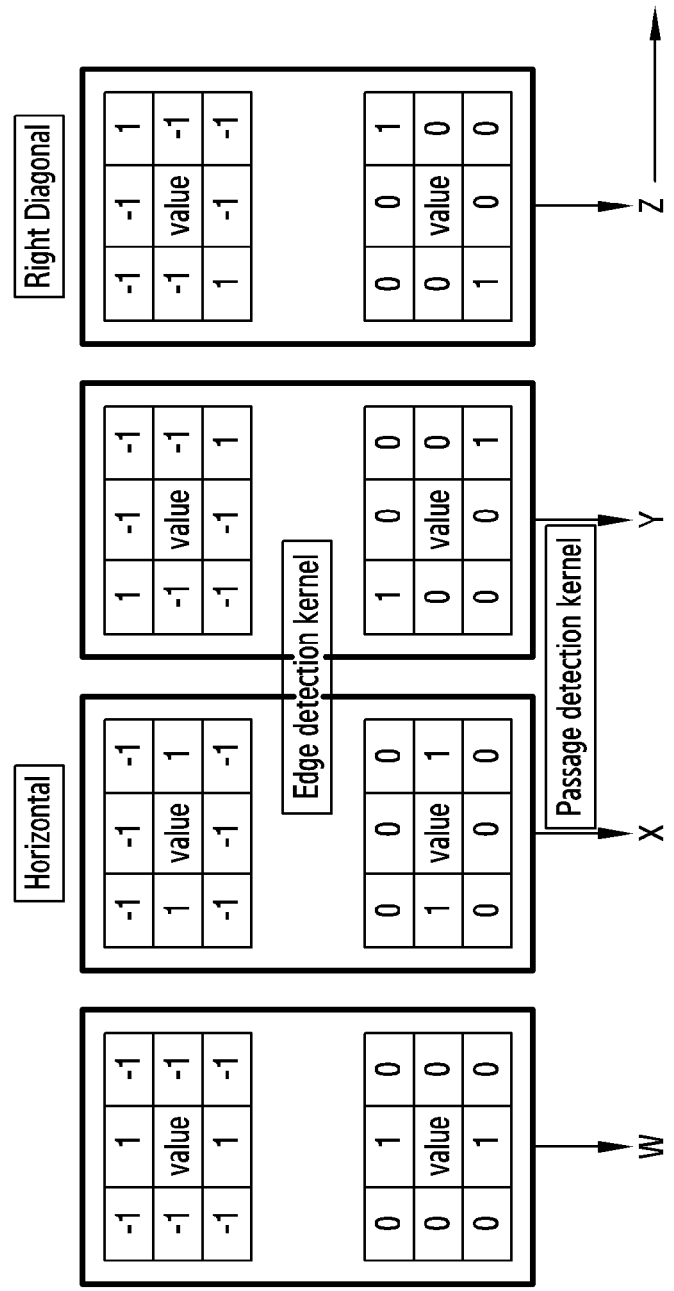

[Fig. 6H]
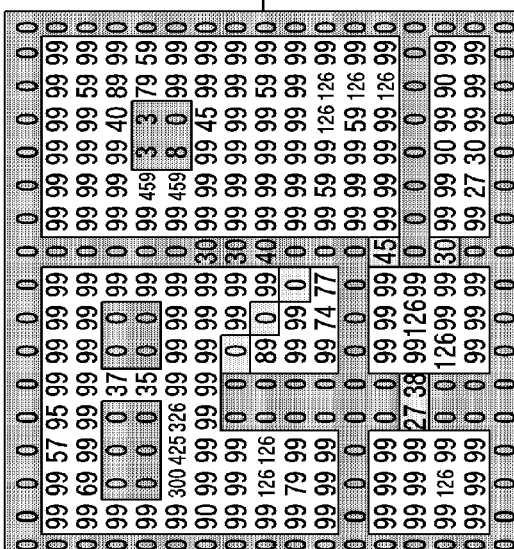

[Fig. 6I]
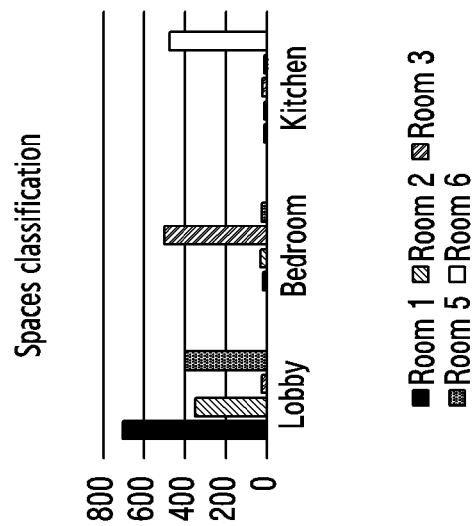
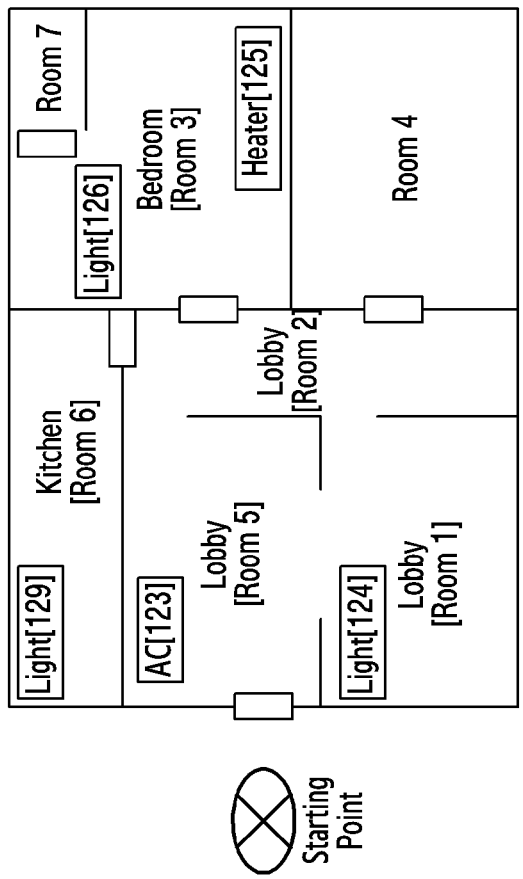

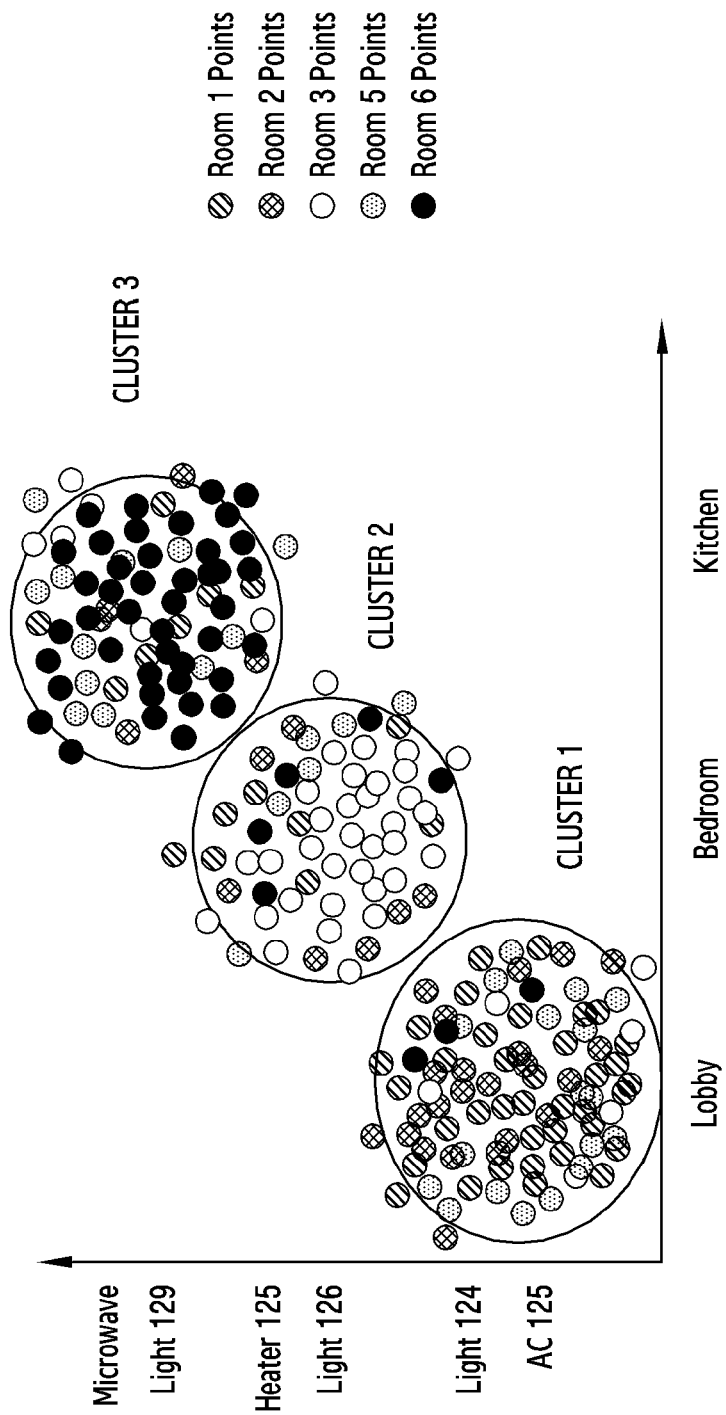
[Fig. 6J]

[Fig. 7A]
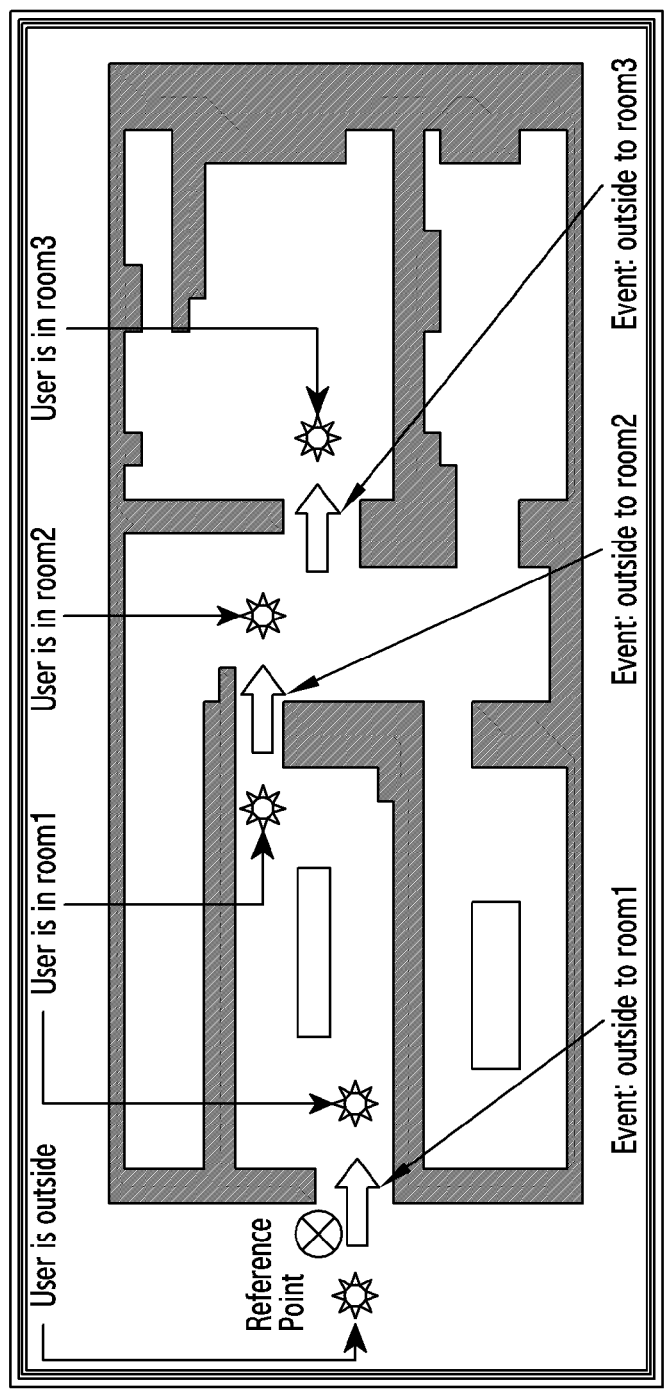

[Fig. 7B]
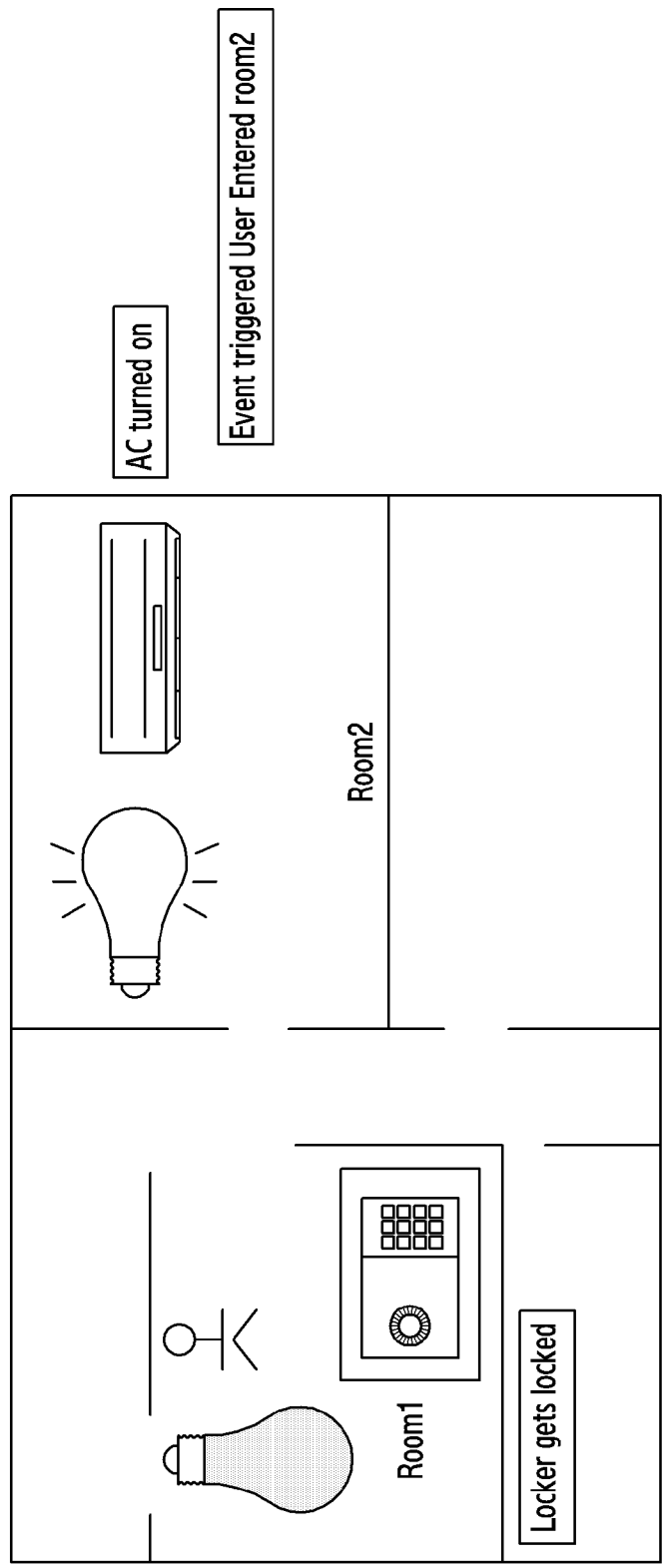

[Fig. 7C]
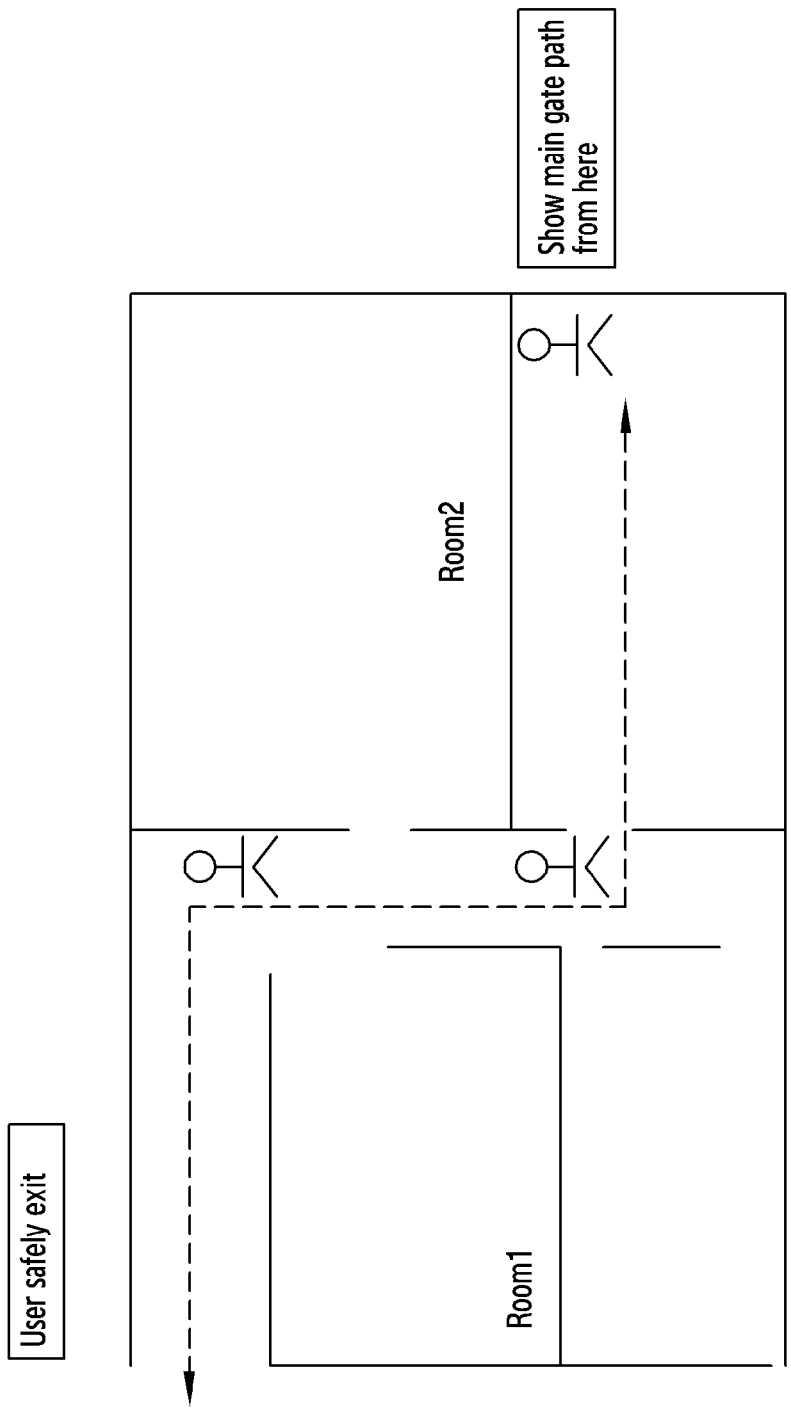

[Fig. 7D]
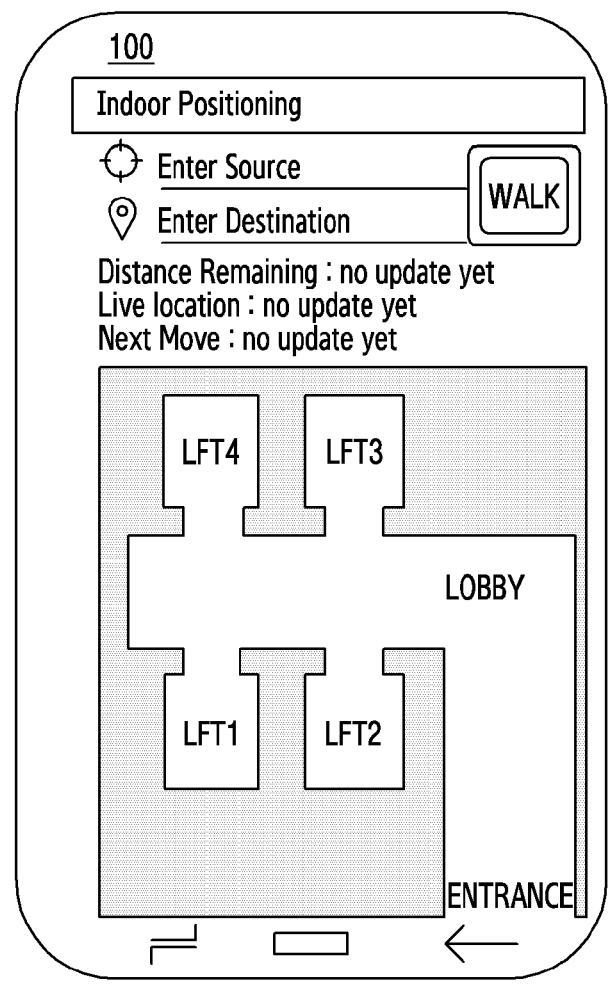

[Fig. 8A]
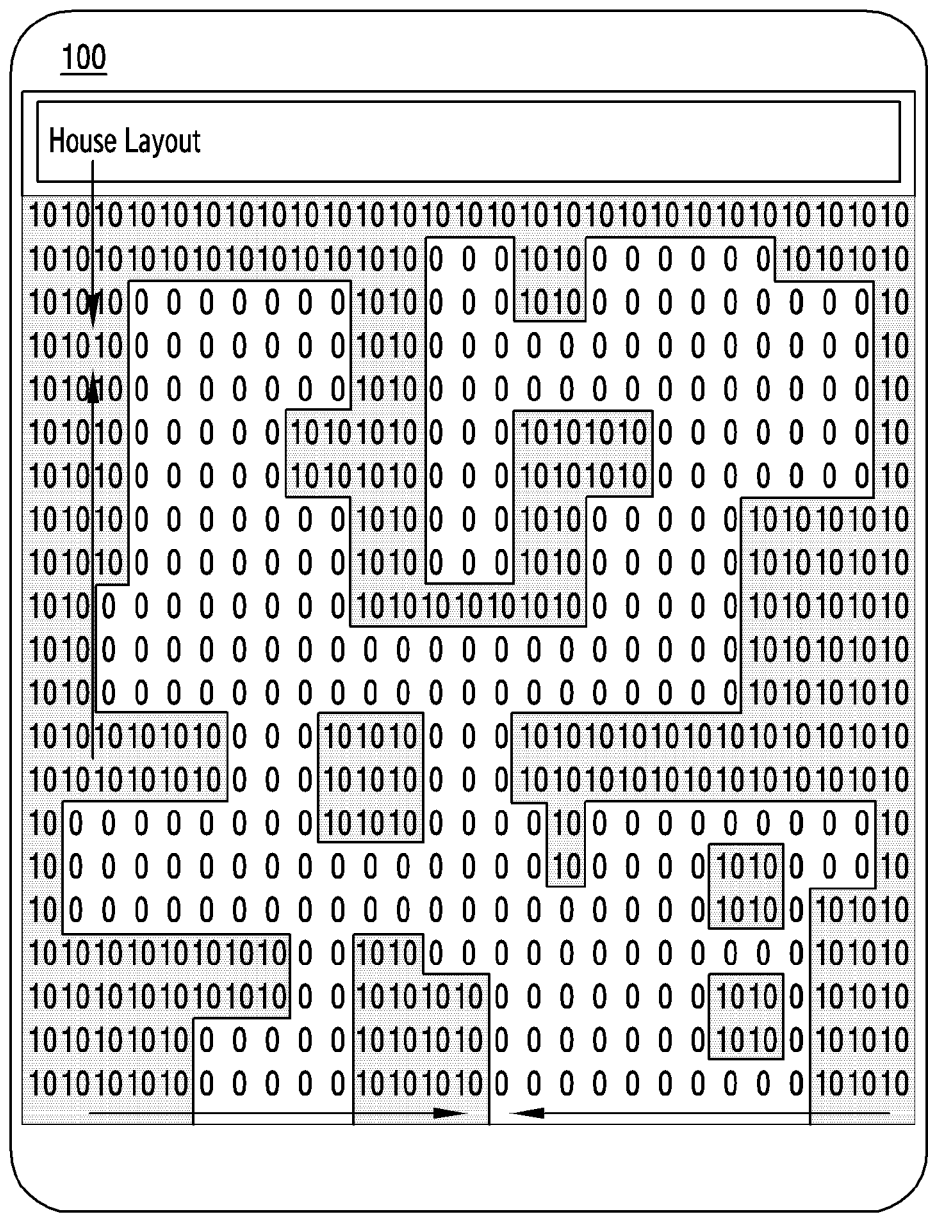

[Fig. 8B]
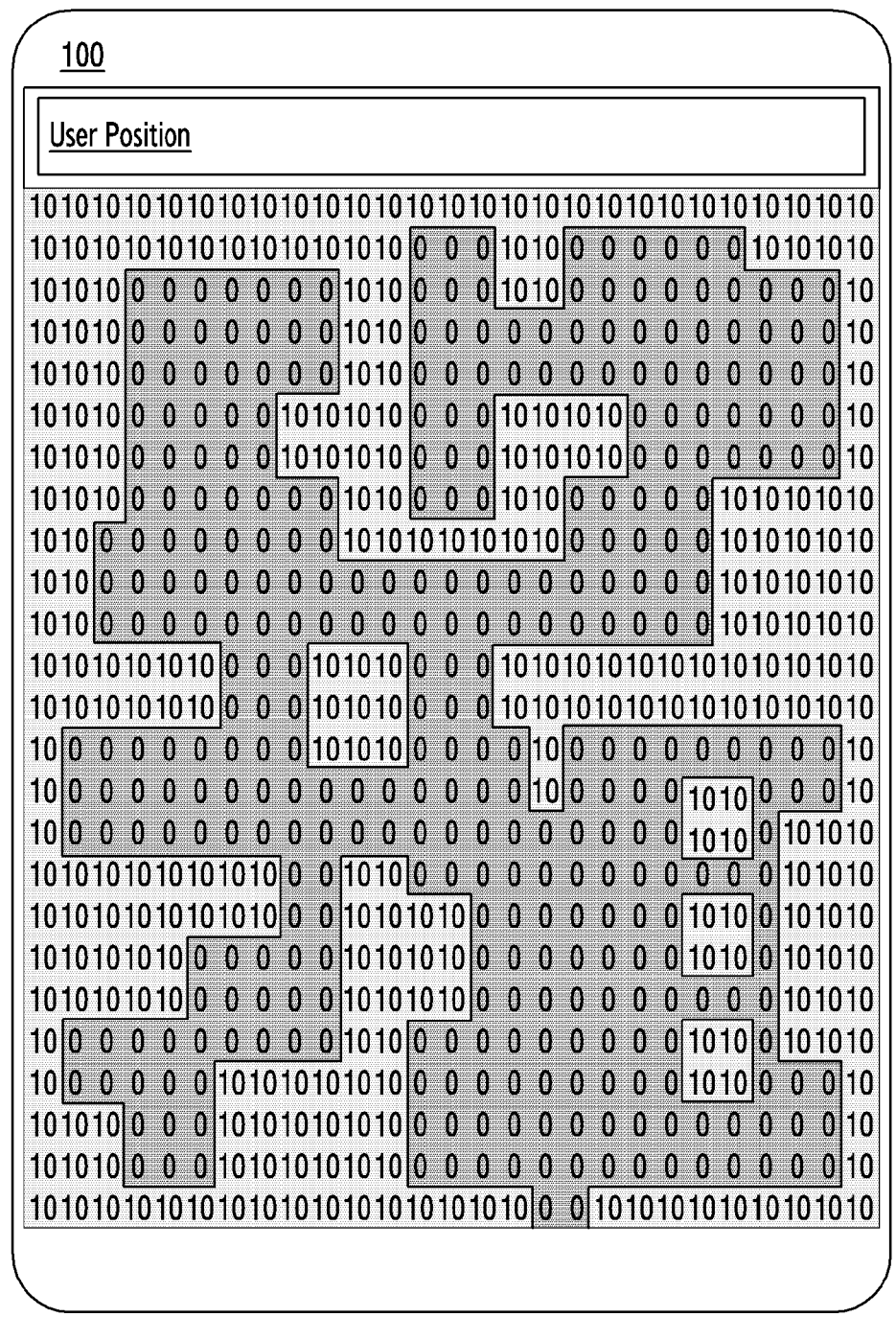

[Fig. 8C]
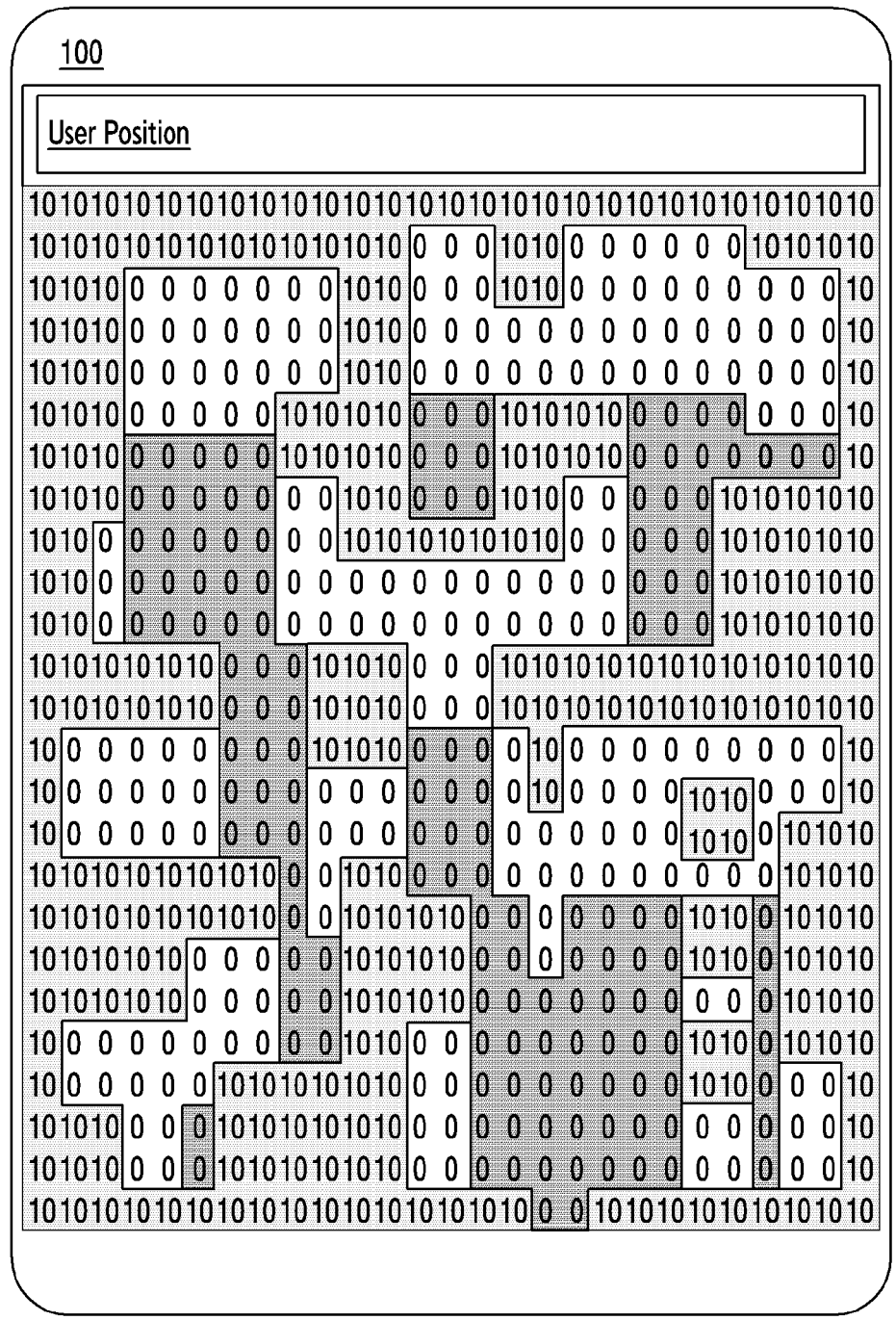

[Fig. 8D]
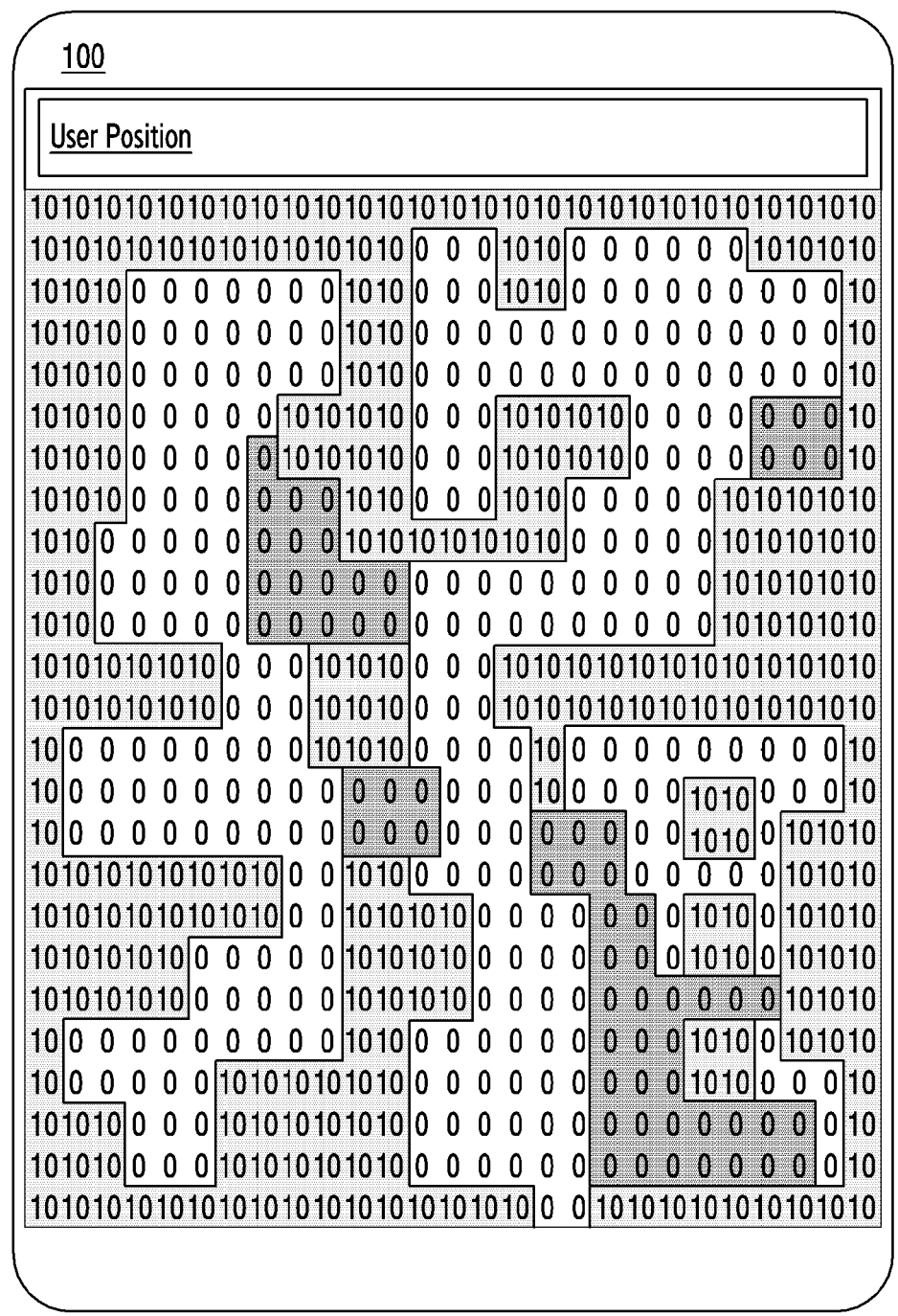

[Fig. 8E]
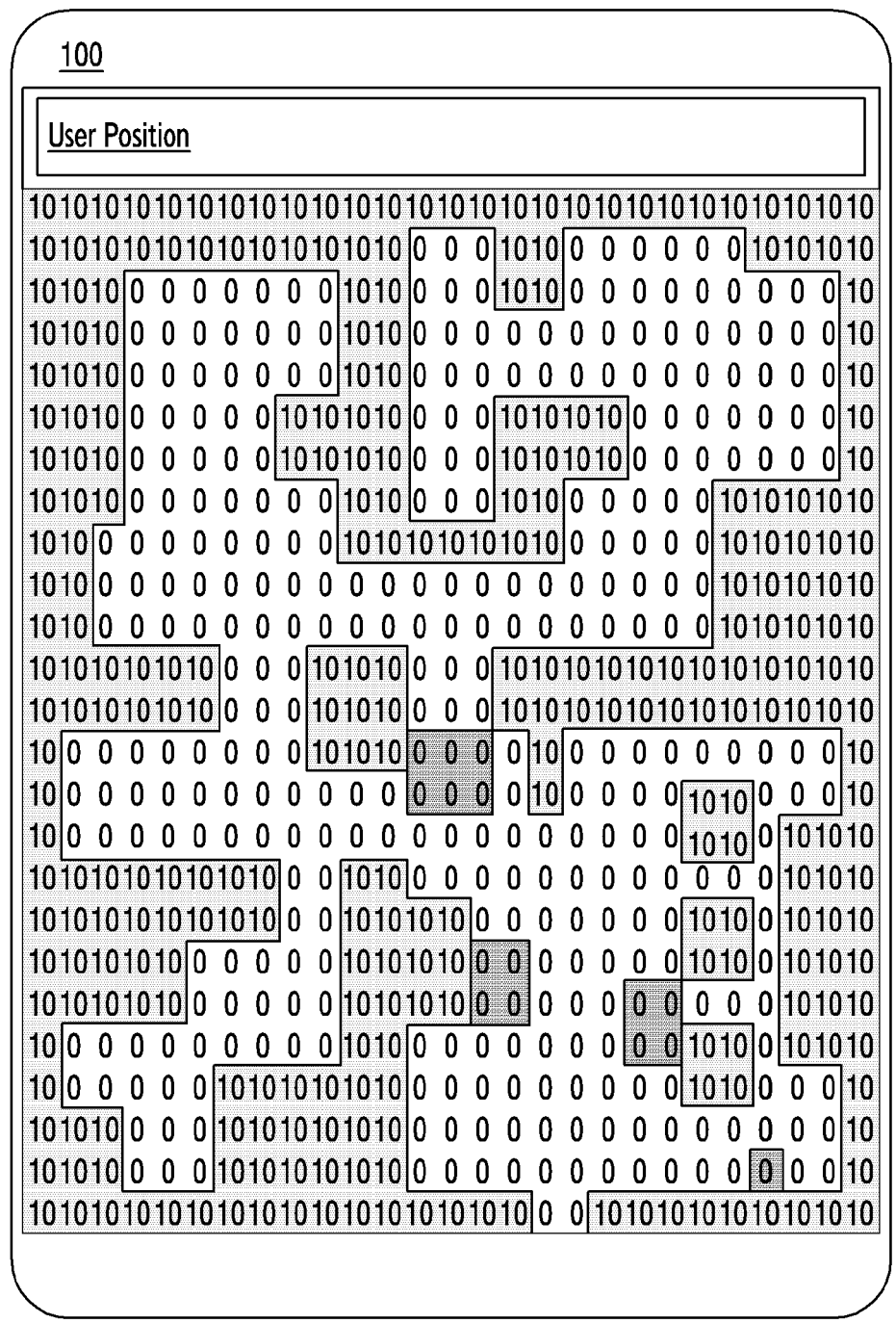

[Fig. 8F]
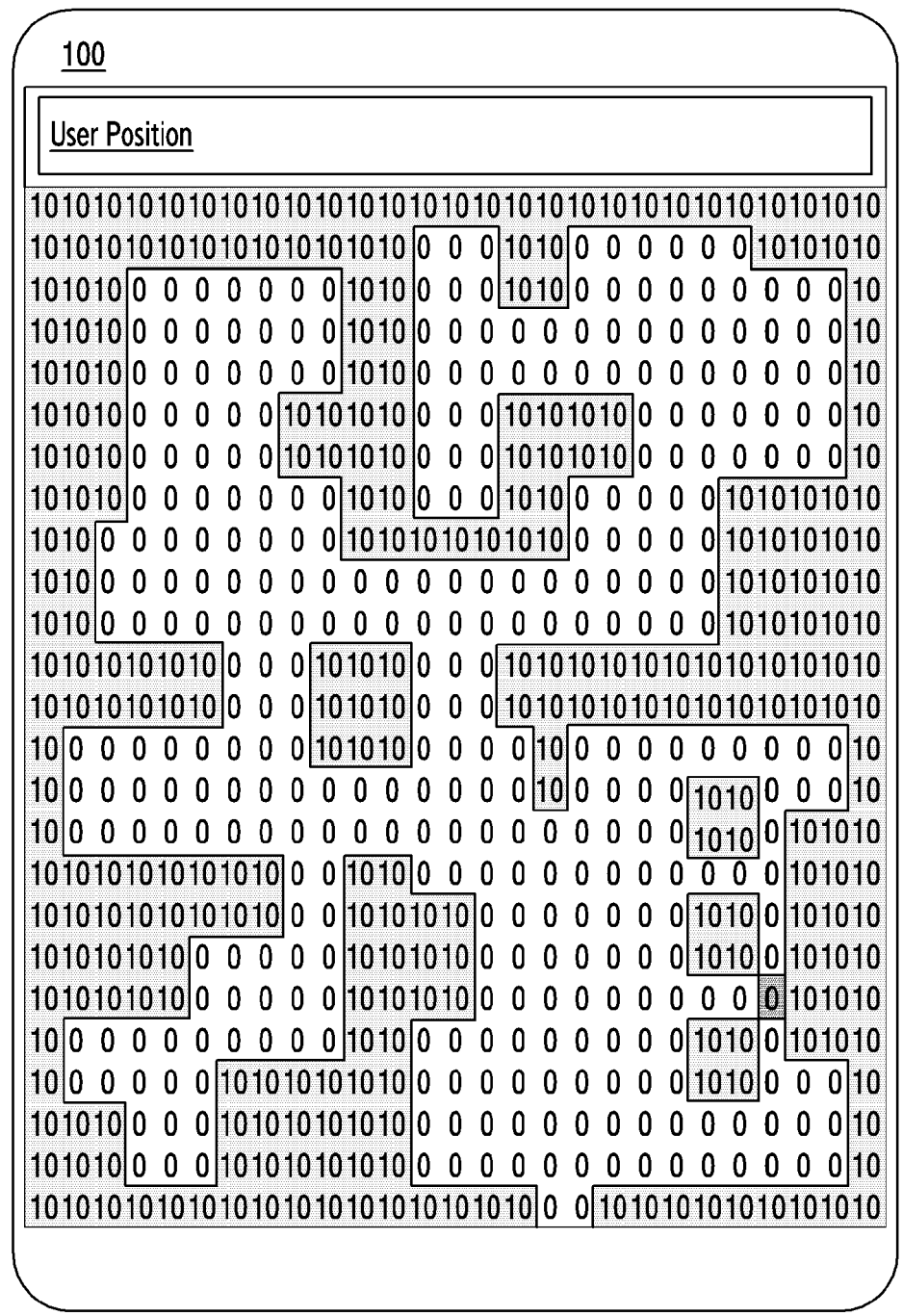

METHOD FOR GENERATING DIAGRAMMATIC REPRESENTATION OF AREA AND ELECTRONIC DEVICE THEREOF

CROSS-REFERENCE TO RELATED APPLICATIONS

This application is a 371 National Stage of International Application No. PCT/KR2020/013010, filed Sep. 24, 2020, which claims priority to Indian Patent Application number 201941038581, filed Sep. 24, 2019, the disclosures of which are herein incorporated by reference in their entirety.

BACKGROUND

1. Field

The present disclosure relates to a smart-area automation system, and more specifically related to a method and electronic device for generating diagrammatic representation of an area.

2. Description of Related Art

In general, one of the biggest challenges of internet of things (IoT) deployment inside an area (e.g., home, office, shopping mall, college campus, factory or the like) is knowledge of user's location inside the area which cannot be fulfilled without availability of a space layout of the area. While indoor positioning methods are available but they usually require extra hardware's like multiple Wireless Fidelity (WiFi)/Bluetooth (BT) access point installations and the indoor positioning methods does not serve the requirement of IoT deployment for automation.

In the existing methods, the method can be used to create a floor plan using laser and Odometer techniques. The method can be used to identify only walkable and non-walkable area but there is no mechanism to identify the various available rooms and passages between the various available rooms. In another existing methods, the method can be used to create the floor plan using Wi-Fi signal strength and physical environment sensor. The method can be used to identify walkable and non-walkable area but there is no mechanism to identify the various available rooms and passages. Further, the method requires additional hardware support and user location tracking cannot be done in no connectivity cases.

Further, in case user's device battery is discharged, the user tracking cannot be done unless the electronic device is charged again, so that the current user location is not known to others.

Thus, it is desired to address the above mentioned disadvantages or other shortcomings or at least provide a useful alternative.

SUMMARY

This disclosure provides a method and electronic device for generating diagrammatic representation of an area.

This disclosure also provides to obtain sensor data over a period of time of a plurality of locations of the area.

This disclosure also provides to determine an intensity of the sensor data based on a number of times the sensor data received of each of the locations.

This disclosure also provides to determine a time period spent by the electronic device in each of the locations.

This disclosure also provides to generate a heat map of the sensor data of each of the location of the area.

This disclosure also provides to identify an edge of a room and a passage of the room in the heat map based on the convolution using a walkable threshold.

This disclosure also provides to generate the diagrammatic representation of the area based on the heat map of the sensor data.

This disclosure also provides to receive a usage of at least one appliance in the diagrammatic representation of the area over a period of time.

This disclosure also provides to determine relation between a user-defined location name and relative position of the at least one appliance.

This disclosure also provides to place the at least one appliance in the diagrammatic representation of the area.

According to the present disclosure, this disclosure provides a method for generating diagrammatic representation of an area. The method includes obtaining, by an electronic device, sensor data over a period of time of a plurality of locations of the area. Further, the method includes generating, by the electronic device, a heat map of the sensor data of each of the location of the area. Further, the method includes generating, by the electronic device, the diagrammatic representation of the area based on the heat map of the sensor data.

According to an embodiment, further, the method includes receiving a usage of at least one appliance in the diagrammatic representation of the area over a period of time. Further, the method includes determining relation between a user-defined location name and relative position of the at least one appliance. Further, the method includes placing the at least one appliance in the diagrammatic representation of the area.

According to an embodiment, further, the method includes performing at least one of an action using the diagrammatic representation of the area, wherein the action comprises tracking at least one of a user in the area using the diagrammatic representation, tracking at least one electronic device in at least one location of the area using the diagrammatic representation, and controlling at least one electronic device in the at least one location of the area using the diagrammatic representation.

According to an embodiment, generating, by the electronic device, the heat map of the sensor data of each of the location of the area includes determining an intensity of the sensor data based on a number of times the sensor data received of each of the locations, determining a time period spent by the electronic device in each of the locations, and generating the heat map based on the intensity of the sensor data and the time period spent by the electronic device in each of the locations.

According to an embodiment, generating, by the electronic device, the diagrammatic representation of the area based on the heat map of the sensor data includes obtaining the heat map based on an intensity of the sensor data and time period spent by the electronic device in each of the locations, obtaining an edge detection kernel matrix in different orientation, wherein the edge detection kernel matrix is configured to identify edges of different orientation in the diagrammatic representation of the area, wherein ratio of maximum walkable value in each of the locations in the heat map and minimum walkable value in each of the locations in the heat map is determined as edge detection kernel center value for all matrices of different orientations, convoluting edge detection kernels in different orientations with the heat map to obtain various edge detection matrices, wherein each edge detection matrix is further used for identifying edges of particular orientation in the diagrammatic representation of the area, and identifying at least one edge of the different orientation of in the diagrammatic representation of the area based on the convolution using a walkable threshold in edge detection matrix.

According to an embodiment, generating, by the electronic device, the diagrammatic representation of the area based on the heat map of the sensor data includes obtaining the heat map based on an intensity of the sensor data and time period spent by the electronic device in each of the locations, obtaining passage detection kernel in different orientations for identifying passages of different orientations in the diagrammatic representation of the area, wherein ratio of maximum walkable value in each of the locations in the heat map and minimum walkable value in each of the locations in the heat map is determined as passage detection kernel center value for all matrices of different orientations, convoluting passage detection kernels in different orientations with the heat map to obtain passage detection matrices, wherein each passage detection matrix is further used for identifying passages of particular orientation in the diagrammatic representation of the area, and identifying at least one passage of different orientation in the diagrammatic representation of the area based on the convolution using a walkable threshold in the passage detection matrix.

According to an embodiment, identifying the at least one passage in the diagrammatic representation of the area based on the convolution using the walkable threshold in the passage detection matrix includes comparing indices of at least one edge determined using the edge detection matrix with same indices of the passage detection matrix to identify at least one passage, and identifying the at least one passage of the at least one room in the diagrammatic representation of the area based on the comparison.

According to an embodiment, the passage detection kernel matrix and the passage detection kernel matrix are determined from different orientations, wherein values of the edge detection kernel matrix and the passage detection kernel matrix determined from various orientations are computed to determine the at least one passage and the at least one edges in the diagrammatic representation of the area.

According to an embodiment, the walkable threshold in the edge detection matrices is determined by convoluting at least one of the edge detection kernel with the minimum walkable matrix.

According to an embodiment, the walkable threshold in the passage detection matrices is determined by convoluting at least one of the passage detection kernel with the minimum walkable matrix.

According to an embodiment, the sensor data is obtained using at least one of an accelerometer sensor, a barometer sensor, a magnetic sensor, a gyroscope sensor and a rotation vector sensor.

According to an embodiment, the accelerometer sensor is configured to estimate a step length by analysing a peak and valley data associated with a step length data, time difference between the peak and valley data associated with the step length data and accelerometer data pattern associated with the step length data by comparing them with a calibrated step peak and valley data, calibrated step time difference data and calibrated step data pattern captured during a calibration activity, while walking the user in the plurality of locations of the area.

According to an embodiment, the sensor data received from the accelerometer sensor is converted from device frame axes to world frame axis using a rotation vector sensor data providing device orientation in world frame axis for step length estimation, while walking the user in the plurality of locations of the area.

According to an embodiment, the barometer sensor is utilized to detect a change in floor by determining relative difference in atmospheric pressure from a first location from the plurality of locations to a second location from the plurality of location.

According to an embodiment, the barometer sensor is utilized to update a reference atmospheric pressure and a reference height by monitoring a variance and standard deviation in atmospheric pressure data over short time period intervals, while walking the user in the plurality of locations of the area.

According to an embodiment, the rotation vector sensor and the accelerometer sensor are utilized to determine a user heading direction relative to north direction irrespective of orientation of the electronic device by analysing the accelerometer data in north-east world axis resulting in a user moving direction vector to compare it with the vector pointing in north direction provided from rotation vector sensor data, wherein the accelerometer data is converted from device frame axis (x-y-z) to world frame axis (North-East-Up) using the rotation vector sensor data providing device orientation in world frame axis, while walking the user in the plurality of locations of the area.

According to the present disclosure, this disclosure provides an electronic device for generating diagrammatic representation of an area. The electronic device includes a processor coupled with a memory. The processor is configured to obtain sensor data over a period of time of a plurality of locations of the area. The processor is configured to generate a heat map of the sensor data of each of the location of the area. Further, the processor is configured to generate the diagrammatic representation of the area based on the heat map of the sensor data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

This disclosure can be achieved without extra hardware & infrastructure dependency. The method can work in case of no connectivity or no electricity like basement/parking area or emergency situation. Extremely less power consumption & CPU usage due to MEMS sensors & separate sensor hub MCU.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 1 illustrates hardware components of an electronic device, according to an embodiment as disclosed herein;

FIG. 2 is an overview of a system for generating diagrammatic representation of the area, according to an embodiment as disclosed herein;

FIG. 3 shows various hardware components of a processor, according to an embodiment as disclosed herein;

FIG. 4 is a flow chart illustrating a method for generating diagrammatic representation of the area, according to an embodiment as disclosed herein;

FIG. 5a is an example scenarios in which inertial sensor data collection is depicted, according to an embodiment as disclosed herein;

FIG. 5b is an example scenarios in which a heat map projection is depicted, according to an embodiment as disclosed herein;

FIG. 5c is an example scenarios in which convolution technology applied to identify rooms and passages in the diagrammatic representation of the area, according to an embodiment as disclosed herein;

FIG. 6a is an example scenarios in which the heat map projection is used to identify walkable and non-walkable area, according to an embodiment as disclosed herein;

FIG. 6b to FIG. 6h are example scenario in which electronic device identifies the various rooms and passages using the edge detection kernel and the passage detection kernel, according to an embodiment as disclosed herein;

FIG. 6i and FIG. 6j are example scenario in which electronic device applies the machine learning to create mapping between the created spaces and user naming convention, according to an embodiment as disclosed herein; and FIG. 7a to FIG. 8f are example scenarios in which the home layout along with use cases are explained, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly embodiments herein achieve a method for generating diagrammatic representation of an area. The method includes obtaining, by an electronic device, sensor data over a period of time of a plurality of locations of the area. Further, the method includes generating, by the electronic device, a heat map of the sensor data of each of the location of the area. Further, the method includes generating, by the electronic device, the diagrammatic representation of the area based on the heat map of the sensor data.

Unlike conventional methods and system, the proposed method can be used to classify and generate the diagrammatic representation of an area (i.e., space layout) and generate an event for an appliance without using an additional hardware element e.g., Wi-Fi/BT access point. The method can be used to generate a space layout plan (e.g., 2D space layout plan, 3D space layout plan, or the like) for the area based on sensor data over which heat-map procedure, convolution procedure and machine learning procedure is applied to identify user's location approximately and accordingly generate/report events to take actions for area automation (e.g., home automation or the like). The method can be used to improve automation in the IoT appliance in the space layout plan and provide additional use cases at low cost since the method does not require additional infrastructure (e.g., Wi-Fi/BT access point).

The method can be used to increase the intensity of heat matrix at a particular area bases on how much time user spent in that area, this can assist to easily distinguish passages which connect two rooms from room.

The method can be used to identify walkable and non-walkable area using inertial sensors, heat map matrix considering walking intensity and time factor. The method can be used to identify various spaces and passages inside the area without using any extra hardware. The method utilizes machine learning techniques to classify various available spaces (e., bedroom, lobby, Kitchen, Washroom or the like) in the area.

The method can be used to generate and report the event for home automation when user location is changed from one space to another. Based on the proposed method, in case user's device battery is discharged, user tracking can be done and tracking is possible in areas where there is no connectivity. The method can be used in the home even there is connectivity available (e.g., electricity gets cut off, signal not received from the electronic device) in a basement parking area and an emergency situation. The user can be tracked further once the electronic device is turned on based on the relative position of user from some initial reference point In an example, an electronic device collects inertial sensor data over the plurality of locations and determines the intensity of inertial sensor data over the plurality of locations (e.g. number of times sensor data is recorded from each of the location). The electronic device calculates the time period spent over the plurality of locations (this will be used to generate the heat map). The electronic device adds the calculated values and plots them to generate a heat map in order to identify the walkable and non-walkable areas. Further, the electronic device convolutes the obtained value from the generated heat map with plurality of line detection kernels (e.g. edge detection kernel and passage detection kernel). Further, the electronic device identifies spaces and passages from the obtained convoluted values when their values crosses a threshold values of spaces and passages, respectively. Further, the electronic device generates a map by naming the identified spaces and passages by using supervised machine learning, wherein the generated map is used for tracking user and controlling IoT devices.

Referring now to the drawings, and more particularly to FIGS. 1 through 8f, there are shown preferred embodiments.

FIG. 1 illustrates hardware components of an electronic device (100), according to an embodiment as disclosed herein. The electronic device (100) can be, for example, but not limited to a cellular phone, a smart phone, a Personal Digital Assistant (PDA), a tablet computer, a laptop computer, an Internet of Things (IoT), a virtual reality device, a smart watch, a server or the like.

In an embodiment, the electronic device (100) includes a processor (110), a communicator (120), a memory (130), a display (140), an accelerometer sensor (150), a barometer sensor (160), a magnetic sensor (170), a gyroscope sensor (180), a rotation vector sensor (190), and a timer (200). The processor (110) is coupled with the communicator (120), the memory (130), the display (140), the accelerometer sensor (150), the barometer sensor (160), the magnetic sensor (170), the gyroscope sensor (180), the rotation vector sensor (190), and the timer (200).

In an embodiment, the processor (110) is configured to obtain sensor data over a period of time of a plurality of locations of an area. In an example, all user movement data is collected in context of known reference point using the accelerometer sensor (150), the barometer sensor (160), the magnetic sensor (170), the gyroscope sensor (180), and the rotation vector sensor (190) as shown in the FIG. 5a. Further, the processor (110) is configured to generate a heat map of the sensor data of each of the location of the area. In an embodiment, the heat map is generated based on how many times user walks through and spends time at a specific point in the area as shown in the FIG. 5b. In an example, as the user walks, over a period of time, the heat map matrix is created with every index having some value depicting the intensity of how many times user walked through that specific point and how much time spent by the user as shown in the FIG. 6a. The intensity value will be more for areas where the user spends more time compared to areas where the user spent less time. In an embodiment, the weightage factor is more for a time factor compared a user walking in the location. In an example, if the 1 step of the user in the location then, the intensity will be increased by 1 value, whereas 1 minute time spent by the user in the location, the intensity will be increased by 2 value.

In an embodiment, the processor (110) is configured to determine an intensity of the sensor data based on a number of times the sensor data received of each of the locations. Further, the processor (110) is configured to determine the time period spent by the electronic device (100) in each of the locations. Further, the processor (110) is configured to generate the heat map based on the intensity of the sensor data and the time period spent by the electronic device (100) in each of the locations.

Further, the processor (110) is configured to generate the diagrammatic representation of the area based on the heat map of the sensor data. In an embodiment, the processor (110) is configured to obtain the heat map based on an intensity of the sensor data and time period spent by the electronic device (100) in each of the locations. Further, the processor (110) is configured to obtain an edge detection kernel matrix in different orientations. Further, the processor (110) is configured to obtain a passage detection kernel matrix in different orientations. Further, the processor (110) is configured to convolute the edge detection kernel with the heat map and the passage detection kernel with the heat map. Further, the processor (110) is configured to identify an edge of the room and a passage of the room in the heat map based on the convolution using a walkable threshold. In an embodiment, the walkable threshold is determined by convoluting at least one of a pre-defined minimum value of the edge detection kernel matrix and the passage detection kernel matrix with minimum walkable matrix.

Further, the processor (110) is configured to receive a usage of at least one appliance (not shown) in the diagrammatic representation of the area over a period of time. Further, the processor (110) is configured to determine relation between a user-defined location name and relative position of the at least one appliance. The processor is configured to place the at least one appliance in the diagrammatic representation of the area. In an example, as shown in the FIG. 6i, the processor (110) is configured to apply the machine learning to name the spaces in accordance to user conventions. The appliance can be, for example, but not limited to a smart TV, a smart light, smart AC, a smart washing machine or the like.

In an embodiment, the processor (110) is configured to perform at least one of an action using the diagrammatic representation of the area, wherein the action comprises tracking at least one of the user in the area using the diagrammatic representation, tracking at least one appliance in at least one location of the area using the diagrammatic representation, and controlling the at least one appliance in the at least one location of the area using the diagrammatic representation.

In an embodiment, the sensor data is obtained using at least one of the accelerometer sensor (150), the barometer sensor (160), the magnetic sensor (170), the gyroscope sensor (180) and the rotation vector sensor (190).

In an embodiment, the accelerometer sensor (150) is configured to estimate a step length by analysing a peak and valley data associated with a step length data, time difference between the peak and valley data associated with the step length data and accelerometer data pattern associated with the step length data by comparing them with a calibrated step peak and valley data, calibrated step time difference data and calibrated step data pattern captured during a calibration activity, while walking the user in the plurality of locations of the area.

In an embodiment, the sensor data received from the accelerometer sensor (150) is converted from device frame axes to world frame axis using the rotation vector sensor (190) for providing device orientation in world frame axis for step length estimation, while walking the user in the plurality of locations of the area.

In an embodiment, the barometer sensor (160) is utilized to detect the change in floor by determining relative difference in atmospheric pressure from a first location from the plurality of locations to a second location from the plurality of location. In an embodiment, the barometer sensor (160) is utilized to update a reference atmospheric pressure and a reference height by monitoring a variance and standard deviation in atmospheric pressure data over short time period intervals, while walking the user in the plurality of locations of the area.

In an embodiment, the rotation vector sensor (190) and the accelerometer sensor (150) are utilized to determine a user heading direction relative to north direction irrespective of orientation of the electronic device by analysing the accelerometer data in north-east world axis resulting in a user moving direction vector to compare it with the vector pointing in north direction provided from rotation vector sensor data, wherein the accelerometer data is converted from device frame axis (x-y-z) to world frame axis (North-East-Up) using the rotation vector sensor data providing device orientation in world frame axis, while walking the user in the plurality of locations of the area.

In the gyroscope sensor (180), by measuring change in angular velocity, it can be known how much degree of turn made by user relative to its heading.

The processor (110) is configured to execute instructions stored in the memory (130) and to perform various processes. The communicator (120) is configured for communicating internally between internal hardware components and with external devices via one or more networks.

The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 1 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function to generate the diagrammatic representation of the area in the electronic device (100).

FIG. 2 is an overview of a system (1000) for generating diagrammatic representation of the area, according to an embodiment as disclosed herein. The system (1000) includes the plurality of electronic device (100a and 100b), a server (100c), and a service provider (300). The server communicates with the plurality of electronic device (100a and 100b) and the service provider (300). The operations and functions of the electronic device (100a and 100b) are already explained in conjunction with the FIG. 1. In an embodiment, the electronic device (100a and 100b) generate the diagrammatic representation of the area and the send the diagrammatic representation to the server (100c). The server (100c) sends the event notification to the server provider (300) based on the event registration. In another embodiment, the electronic device (100a and 100b) sends the senor data to the server (100c). Based on the sensor data, the server (100c) generates the diagrammatic representation of the area.

Although the FIG. 2 shows various hardware components of the system (1000) but it is to be understood that other embodiments are not limited thereon. In other embodiments, the system (1000) may include less or more number of components. Further, the labels or names of the components are used only for illustrative purpose and does not limit the scope of the invention. One or more components can be combined together to perform same or substantially similar function to generate the diagrammatic representation of the area in the system (1000).

FIG. 3 shows various hardware components of the processor (110), according to an embodiment as disclosed herein. In an embodiment, the processor (110) includes a sensor data obtaining engine (302), a heat map generating engine (304), an area representation engine (306), a walkable area and non-walkable area determination engine (308), a spaces and passages determination engine (310), a current height reference maintaining engine (312), a step calibration engine (314), an edge detection kernel engine (316), a passage detection kernel engine (318), a floor detector (320), device orientation detection engine (322), and a step detector module (324).

In an embodiment, the sensor data obtaining engine (302) is configured to obtain sensor data over the period of time of the plurality of locations of an area. Further, the heat map generating engine (304) is configured to generate the heat map of the sensor data of each of the location of the area. In an embodiment, the heat map generating engine (304) is configured to determine the intensity of the sensor data based on a number of times the sensor data received of each of the locations. Further, the heat map generating engine (304) is configured to determine the time period spent by the electronic device (100) in each of the locations using the timer (200). Further, the heat map generating engine (304) is configured to generate the heat map based on the intensity of the sensor data and the time period spent by the electronic device (100) in each of the locations.

Further, the area representation engine (306) is configured to generate the diagrammatic representation of the area based on the heat map of the sensor data using the walkable area and non-walkable area determination engine (308) and a spaces and passages determination engine (310). Further, the area representation engine (306) is configured to identify an edge of the room and a passage of the room in the heat map based on the convolution using a walkable threshold.

In an embodiment, the current height reference maintaining engine (312) monitors the changes in pressure every 2 minutes, converts the atmospheric pressure to height using standard known formula and updates the reference height value. Further, if variation in pressure data collected over 2 minutes is very less, the current height reference maintaining engine (312) will update the current height value. As atmospheric pressure changes minutely after short time and majorly after long time due to climate changes, the current height reference maintaining engine (312) needs to keep updating the current height reference value in short time in order to deduce change in floor correctly. Further, the floor detector (320) will monitor the change in height and if difference is more than usual floor height difference, then the floor information will be updated.

The device orientation detection engine (322) calculates the azimuth, pitch, roll values using standard formula on rotation vector values. The pitch is counter-clockwise degrees around x-axis required to align the device x-axis in world north/east frame. The roll is Counter-ClockwiseDegrees around y-axis required to align the device y-axis in world north/east frame. The azimuth is Counter-Clockwise-Degrees around z-axis required to point the device y-axis to north direction.

The step calibration engine (314) collects the number of steps taken by user using the step detector (324) and for each step, will collect the peak & valley acceleration value and time difference between each peak & valley value and stores them in the memory (130) after averaging them. The step calibration engine (314) will store the average step length of the user based on number of steps taken & fixed distance used for calibration. In an example, if number of steps are 60 and distance travelled is 30 meters, average/usual step length of the person is 0.5 meters.

The step detector (324) will map accelerometer value of all 3 device reference axis into world reference axis using the device orientation detection engine (322). The step detector (324) will analyze the change in acceleration values in world reference axis (North-East-Up) and if the Up-Down axis has specific pattern of peak and valley, it will be detected as a step.

In an example, one cell of the heat map matrix represent one third of step length of user. The sensor (150-190) produces sensor data at a defined clock rate say 20 milisecond. These sensor data (e.g., distance direction and timestamp) is feed in to a motion and a relative position analyzer (not shown). The heat map generating engine (304) is requested to increase cell value by 1. The timer (200) also run in loop which fetched sensor data from the sensors (150-190) with defined period say 1 minute. The timer (200) fetches value and compare the recent value with a previous sensor data value. If no motion detected, the timer (200) updates cell value by adding 2 to current value. This way cell intensity where the user spends more time will be more and cell intensity for passage will be less. The cell propagator block (not shown) will check for possible walkable point set in an up direction/down direction/left direction/right direction using the walkable area and non-walkable area determination engine (308) and the spaces and passages determination engine (310).

The edge detection kernel engine (316) is configured to obtain the heat map based on the intensity of the sensor data and time period spend by the electronic device (100) in each of the locations. Further, the edge detection kernel engine (316) is configured to obtain the edge detection kernel matrix from a horizontal orientation, a vertical orientation and a diagonal orientation. The ratio of a maximum walkable value in each of the locations to a minimum walkable value in each of the locations in the heat map is determined as an edge detection kernel center value. Further, the edge detection kernel engine (316) is configured to convolute the edge detection kernel with the heat map to obtain an edge detection matrix using the edge detection kernel center value. Further, the edge detection kernel engine (316) is configured to identify at least one edge of at least one room in the diagrammatic representation of the area based on the convolution using the walkable threshold.

The passage detection kernel engine (318) is configured to obtain the heat map based on an intensity of the sensor data and time period spent by the electronic device (100) in each of the locations. Further, the passage detection kernel engine (318) is configured to obtain the passage detection kernel matrix from the horizontal orientation, the vertical orientation and the diagonal orientation. The ratio of a maximum walkable value in each of the locations to a minimum walkable value in each of the locations in the heat map is determined as the passage detection kernel center value. Further, the passage detection kernel engine (318) is configured to convolute the passage detection kernel with the heat map using the passage detection kernel center value. Further, the passage detection kernel engine (318) is configured to identify at least one passage of at least one room in the diagrammatic representation of the area based on the convolution using a walkable threshold.

In an embodiment, the passage detection kernel engine (318) is configured to identify the at least one passage of the at least one room in the diagrammatic representation of the area by comparing indices of the at least one edge determined using the edge detection matrix with indices of the passage detection matrix to identify the at least one passage.

In an embodiment, the edge detection kernel matrix and the edge detection kernel matrix are determined from the horizontal orientation, the vertical orientation and the diagonal orientation, wherein values of the edge detection kernel matrix and the edge detection kernel matrix determined from the horizontal orientation, the vertical orientation and the diagonal orientation are computed to determine the at least one passage and the at least one edges in the diagrammatic representation of the area.

In an example, initially, user registers all IoT appliances to IoT controller, with details like device name, user-defined location, device capabilities. The IoT controller sends update to the server (10c), when some appliance is operated with relative position, appliance id, user-defined location name for appliance. Once sufficient data is available, the machine learning clustering procedure is applied as shown in the FIG. 6i and FIG. 6j. Now, errors points are removed from created cluster by creating histogram and learning frequency of various observation as shown in the FIG. 6i and FIG. 6j. Now for qualified points, relation is associated between the user-defined location name and relative position.

Finally IoT appliance are placed on the diagrammatic representation as per learned location.

Because of time factor intensity logic, the method can be used to identify the rooms (e.g., bedroom or defining obstacles like bed o the like), understanding intensity pattern increasing at particular location at particular period of time. It can be mapped with other data like heart rate or pattern recognized out of special sensor. The method can be used to identify the passages and rooms and also adds input to define type of rooms in an accurate manner.

Although the FIG. 3 shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to generate the diagrammatic representation of the area.

FIG. 4 is a flow chart (400) illustrating a method for generating diagrammatic representation of the area, according to an embodiment as disclosed herein. The operations (402-414) are performed by the processor (110). At 402, method includes obtaining the sensor data over the period of time of the plurality of locations of the area. At 404, the method includes generating the heat map of the sensor data of each of the location of the area. At 406, the method includes generating the diagrammatic representation of the area based on the heat map of the sensor data. At 408, the method includes performing the action using the diagrammatic representation of the area. At 410, the method includes updating the user location based on the sensor data. At 412, the method includes determining the user enters into the room. If the user enters into the room then, at 414, the method includes triggering the events to auto generate actions for home appliances.

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

FIG. 6c to FIG. 6h are example scenario in which electronic device (100) identifies the various rooms and passages using the edge detection kernel and the passage detection kernel, according to an embodiment as disclosed herein. The various rooms and passages are determined using the edge detection kernel engine (316) and the passage detection kernel engine (318).

As shown in the FIG. 6c, the line detection operator consists of a convolution kernel tuned to detect the presence of lines of a particular width at a particular orientation. The different kernel can be generated to detect walls in various orientations. In order to enhance the procedure for the round corners, canny operators can be used to convolute with the found heat map. It works on the principle of constructive & destructive interference when kernel match with the image, the kernel match produces higher amplitude. Four line detection kernels which respond maximally to horizontal, vertical and oblique (+45 and −45 degree) single pixel wide lines.

Let's, consider below tuned vertical edge/passages kernel to detect edge/passages. After applying all 4 kinds of kernel, all edges/passages in different orientations will be discovered. The value 45 (450/10) is selected based on ratio of maximum step intensity (450) to minimum value to consider walkable point (10).

| −1 | 1 | −1 |
| −1 | 45 | −1 |
| −1 | 1 | −1 |

Edge Detection Kernel

| 0 | 1 | 0 |
| 0 | 45 | 0 |
| 0 | 1 | 0 |

Passage Detection Kernel

Consider, taking the part of heat matrix in the FIG. 6a as input. Consider Kernel as shown is the FIG. 6b. Apply it to given matrix, result will be the FIG. 6d. This define total available separate spaces in layout—5 SPACES identified and Value >200=Space, value <200=obstacles/walls.

Next step is to detect passages and consider Kernel as shown is the FIG. 6e. Apply it to given matrix, result will be the FIG. 6f. Here values greater than 400 will be walkable and values less than 200 are non-walkable area [i.e., obstacles]. Comparison will be performed between all detected edges in the FIG. 6d with FIG. 6f.

There will be below 4 edge detection kernel and 4 passage detection kernel as shown in the FIG. 6g. Consider, the value is maximum value in the heat matrix/defined threshold for walkable value (450/10=45). The orientation module selects all orientation one by one and corresponding edge detection kernel and the passage convoluted matrix for the edges will be processed further to extract spaces. The walkable and non-walkable thresholds are defined, by convoluting with minimum walkable case. In the proposed methods, in an example, walkable threshold will be 400, so anything greater than 451 is walkable else obstacle/Passage. For the passage identifier, the processor takes all edges from convoluted matrix for edge and checks corresponding value in convoluted matrix for the passage, if value is walkable, it is marked as passage. The identified passage and obstacle updated to the heat matrix.

Similarly, the processor needs to perform for horizontal, left diagonal and right diagonal kernel to increase accuracy, as it is possible few more edges and passage are defined by horizontal, vertical and diagonal kernels. Let's say there is passage which is diagonal, this passage will not be concluded with vertical space/passage kernel but with diagonal kernel, it will be identified.

FIG. 6i is an example scenario in which the electronic device (100) applies the machine learning to create mapping between the created spaces and user naming convention, according to an embodiment as disclosed herein.

Consider, initially while adding appliances to an IoT controller (not shown) (lie inside the mobile electronic device (100)), user provided the location where appliance is present as shown in the table 1.

TABLE 1

| Location | Appliance list |
|---|---|
| Lobby | AC[123], Light[124] |
| Bedroom | Heater[125], Light[126] |
| Kitchen | Light[129], Microwave[130] |

Now, when the user takes some action on any appliance through the controller or a switchboard, an entry is created in database about user relative location, appliance and user specified location as show in the table 2 and table 3.

TABLE 2

| Space | appliance | user convention |
|---|---|---|
| room1 | AC [ID 125] | Lobby |
| room5 | AC [ID 125] | Lobby |
| room1 | Light [ID 124] | Lobby |
| room5 | AC [ID 125] | Lobby |
| room1 | AC [ID 125] | Lobby |
| room1 | Light [ID 124] | Lobby |
| room5 | AC [ID 125] | Lobby |
| room1 | Light [ID 124] | Lobby |
| room3 | Light [id 126] | bedroom |
| room3 | Light [id 126] | bedroom |

TABLE 3

| | | |
|---|---|---|
| room3 | Heater [id 125] | bedroom |
| room3 | Heater [id 125] | bedroom |
| room3 | Heater [id 125] | bedroom |
| room6 | Microwave[130] | Kitchen |
| room6 | Microwave[130] | Kitchen |
| room6 | Microwave[130] | Kitchen |
| room6 | Microwave[130] | Kitchen |
| room6 | Microwave[130] | Kitchen |
| room6 | Light [id 129] | Kitchen |
| room6 | Light [id 129] | Kitchen |
| room6 | Light [id 129] | Kitchen |

Over a period of time, a big data will be created then using clustering algorithm and statistics, an association can be learned between the various spaces and user convention. As shown in the FIG. 6*j*, each point in cluster represent that the appliance which is part of pre-defined user location is turned on/off or controlled from which room in layout. Each learnt cluster is processed using statistics like histogram etc. to remove noise.

In an example, the IoT controller controls various IoT devices and user operate any device using IoT controller, user relative position and IoT device entry in made to database along with user-defined location of the IoT device. The server (100*c*) runs clustering algorithm on collected dataset, once sufficient amount of data is available, creating cluster of various relative points having common IoT device and spaces.

First feature scaling is performed for various IoT devices and user-defined spaces. For every points P in dataset, the neighboring points are find out which are in range (*eps) of considered point P. And if N such points are found which satisfy N>=*MinPts, assign a cluster. For every points P in dataset, the neighboring points are find out which are in range (*eps) of considered point P. And if N such points are found which satisfy N>=*MinPts, assign a cluster. Eps defines the neighbourhood around a data point i.e. if the distance between two points is lower or equal to 'eps' then they are considered as neighbours. *MinPts: Minimum number of neighbors (data points) within eps radius.

A point a and b are said to be density connected if there exist a point c which has a sufficient number of points in its neighbours and both the points a and bare within the eps distance. Now every point is taken and its Euclidean distance is calculated from various cluster points, this way all points are assigned to one cluster. Parallel clusters are updated, as average of items categorized in that cluster so far. Once all datasets are assigned to one cluster, then histogram for various defined cluster is created to understand frequency of any appliance being operated from specific defined space. This will help to mitigate error case. The user-defined names are assigned to various generated spaces.

As shown in the FIG. 7*a*, as home layout is generated along with rooms & passage Identification, so that the user can be located and tracked inside the different rooms in the home. The events can be generated when person enters/leaves a room through a passage to automate actions on home appliances. In an example, as shown in the FIG. 7*b*, once the user moves from the room 1 to room 2, the locker in the room 1 is locked and the AC and the light are turned on.

In an example, as shown in the FIG. 7*b*, once map is created and if device battery is down, so user cannot be tracked further. After device is turned ON after charging, user location can be anywhere inside the house. As person walks, then with each step and each turn, user can only be at some certain location because other paths will break walls/obstacles so they are not valid user movements. On further user movements, possible locations will be reduced further more. Eventually, only one real location will exist which could satisfy the path pattern travelled by the user from some unknown location. Highly possible user locations are charging points in above case, so we can consider these points as initial possibilities to narrow down search.

In an example, as shown in the FIG. 7*c* and FIG. 7*d*, an indoor navigation can be achieved without extra hardware & infrastructure dependency In an example, as shown in the FIG. 8*a* to FIG. 8*f*, after device battery is down, the possibilities of real user location as shown in yellow is unknown. After device battery is charged and user moves 4 steps south, possibilities of real user location are narrowed. Next, after user moves 4 steps west, possibilities of real user locations are narrowed further down. Next, after user another 4 steps west and 4 steps south, possibilities of real user locations are narrowed further. Next, after user another 9 steps west, only one real location is possible, so user is located precisely.

In another example, an indoor navigation can be achieved without extra hardware & infrastructure dependency. The method can work in case of no connectivity or no electricity like basement/parking area or emergency situation. Extremely less power consumption & CPU usage due to MEMS sensors & separate sensor hub MCU In another example, the electronic device (100) detects change in the appliance behavior based on quantity of users in the room. In an example, the air conditioner will be operated based on how many users are present in a space layout and mode of the air conditioner will change. This results enhancing the user experience.

In another example, the electronic device (100) changes the appliance behavior based on type of the user in the room. In an example, If only child is present in room, parental guidance channel will be blocked in the TV. If some other member enters, child lock can be removed in the TV.

In another example, the electronic device provides an appliance settings personalization. In an example, one user can prefer X degree & other user can prepare Y degree, so that air conditioner can change its settings based on user preference.

In another example, interested parties can subscribe for location based events. In an example, if the user is in the kitchen, the user can will receive the notifications from the cooking assistance apps. If the user is in a workout area, the user can will receive the notifications from health related application. If the user is in a dressing room, the user can will receive the notifications from the e-commerce application.

The method can provides a suggestions on the appliances based on Time Spent by the user. The appliance positioning can be suggested for effective usage based on where users spent most time on the appliance.

In another example, the electronic device (100) generates the events without change in actual user location. In an example, automation of change in phone settings while having breakfast/lunch/dinner which can be sensed using motion sensor data.

The embodiments disclosed herein can be implemented using at least one software program running on at least one hardware device and performing network management functions to control the elements.

According to an embodiment, this disclosure provides a method for generating diagrammatic representation of an area, comprises: obtaining, by an electronic device (100), sensor data of a plurality of locations associated with the area over a period of time; generating, by the electronic device (100), a heat map of the sensor data of each of the location of the area; and generating, by the electronic device (100), the diagrammatic representation of the area based on the heat map of the sensor data.

According to an embodiment, this disclosure provides further comprises: receiving, by the electronic device (100), a usage of at least one appliance in the diagrammatic representation of the area over a period of time; classifying, by the electronic device (100), spaces in the diagrammatic representation by determining relation between a user-defined location name and relative position of the at least one appliance using a machine learning procedure; and placing, by the electronic device (100), the at least one appliance in the diagrammatic representation of the area.

According to an embodiment, this disclosure provides performing, by the electronic device (100), at least one of an action using the diagrammatic representation of the area, wherein the action comprises tracking at least one of a user in the area using the diagrammatic representation, tracking at least one appliance in at least one location of the area using the diagrammatic representation, and controlling the at least one appliance in the at least one location of the area using the diagrammatic representation.

According to an embodiment, wherein generating, by the electronic device (100), the heat map of the sensor data of each of the location of the area comprises: determining an intensity of the sensor data based on a number of times the sensor data received of each of the locations; determining a time period spent by the electronic device (100) in each of the locations; and generating the heat map based on the intensity of the sensor data and the time period spent by the electronic device (100) in each of the locations.

According to an embodiment, wherein generating, by the electronic device (100), the diagrammatic representation of the area based on the heat map of the sensor data comprises: obtaining the heat map based on an intensity of the sensor data and time period spent by the electronic device (100) in each of the locations; obtaining an edge detection kernel matrix in different orientation, wherein the edge detection kernel matrix is configured to identify edges of different orientation in the diagrammatic representation of the area, wherein ratio of maximum walkable value in each of the locations in the heat map and minimum walkable value in each of the locations in the heat map is determined as edge detection kernel center value for the edge detection kernel matrix of different orientations; convoluting edge detection kernels in different orientations with the heat map to obtain various edge detection matrices, wherein each edge detection matrix is further used for identifying the edges of particular orientation in the diagrammatic representation of the area; and identifying at least one edge of the different orientation of in the diagrammatic representation of the area based on the convolution using a walkable threshold in edge detection matrix.

According to an embodiment, wherein generating, by the electronic device (100), the diagrammatic representation of the area based on the heat map of the sensor data comprises: obtaining the heat map based on an intensity of the sensor data and time period spent by the electronic device (100) in each of the locations; obtaining passage detection kernel in different orientations for identifying passages of different orientations in the diagrammatic representation of the area, wherein ratio of maximum walkable value in each of the locations in the heat map and minimum walkable value in each of the locations in the heat map is determined as passage detection kernel center value for all matrices of different orientations; convoluting passage detection kernels in different orientations with the heat map to obtain passage detection matrices, wherein each passage detection matrix is further used for identifying passages of particular orientation in the diagrammatic representation of the area; and identifying at least one passage of different orientation in the diagrammatic representation of the area based on the convolution using a walkable threshold in the passage detection matrix.

According to an embodiment, wherein identifying the at least one passage in the diagrammatic representation of the area based on the convolution using the walkable threshold in the passage detection matrix comprises: comparing indices of at least one edge determined using the edge detection matrix with same indices of the passage detection matrix to identify at least one passage; and identifying the at least one passage of the at least one room in the diagrammatic representation of the area based on the comparison.

According to an embodiment, wherein the passage detection kernel matrix and the passage detection kernel matrix are determined from different orientations, wherein values of the edge detection kernel matrix and the passage detection kernel matrix determined from various orientations are computed to determine the at least one passage and the at least one edges in the diagrammatic representation of the area.

According to an embodiment, wherein the walkable threshold in the edge detection matrices is determined by convoluting at least one of the edge detection kernel with the minimum walkable matrix.

According to an embodiment, wherein the walkable threshold in the passage detection matrices is determined by convoluting at least one of the passage detection kernel with the minimum walkable matrix.

According to an embodiment, wherein the sensor data is obtained using at least one of an accelerometer sensor (150), a barometer sensor (160), a magnetic sensor (170), a gyroscope sensor (180) and a rotation vector sensor (190).

According to an embodiment, wherein the accelerometer sensor (150) is utilized to estimate the step length by analysing the peak and valley data associated with the step length data, time difference between the peak and valley data associated with the step length data and accelerometer data pattern associated with the step length data by comparing peak and valley data, time difference between peak and valley data, accelerometer data pattern of current step data which is generated with every new step with the calibrated step peak and valley data, calibrated step time difference data and calibrated step data pattern captured during the calibration activity, while walking the user in the plurality of locations of the area.

According to an embodiment, wherein the barometer sensor (160) is utilized to detect a change in floor by determining relative difference in atmospheric pressure from a first location from the plurality of locations to a second location from the plurality of location.

According to an embodiment, wherein the barometer sensor (170) is utilized to update a reference atmospheric pressure and a reference height by monitoring a variance and standard deviation in atmospheric pressure data over short time period intervals, while walking the user in the plurality of locations of the area.

According to an embodiment, wherein the rotation vector sensor (190) and the accelerometer sensor (150) are utilized to determine a user heading direction relative to north direction irrespective of orientation of the electronic device (100) by analysing the accelerometer data in north-east-up world axis resulting in a user moving direction vector in north-east-up axis frame with the vector pointing in north direction provided from rotation vector sensor data, wherein the accelerometer data is converted from device frame axis to world frame axis using the rotation vector sensor data providing device orientation in world frame axis, while walking the user in the plurality of locations of the area.

According to an embodiment, this disclosure provides an electronic device (100) for generating diagrammatic representation of an area, comprises: a memory (130); a processor (110), coupled with the memory (130), configured to: obtain sensor data of a plurality of locations associated with the area over a period of time; generate a heat map of the sensor data of each of the location of the area; and generate the diagrammatic representation of the area based on the heat map of the sensor data.

According to an embodiment, wherein the processor (110) is configured to: receive a usage of at least one appliance in the diagrammatic representation of the area over a period of time; classify spaces in the diagrammatic representation by determining relation between a user-defined location name and relative position of the at least one appliance using a machine learning procedure; and place the at least one appliance in the diagrammatic representation of the area.

According to an embodiment, wherein the processor (110) is configured to perform at least one of an action using the diagrammatic representation of the area, wherein the action comprises tracking at least one of a user in the area using the diagrammatic representation, tracking at least one appliance in at least one location of the area using the diagrammatic representation, and controlling the at least one appliance in the at least one location of the area using the diagrammatic representation.

According to an embodiment, wherein generate the heat map of the sensor data of each of the location of the area comprises: determine an intensity of the sensor data based on a number of times the sensor data received of each of the locations; determine a time period spent by the electronic device (100) in each of the locations; and generate the heat map based on the intensity of the sensor data and the time period spent by the electronic device (100) in each of the locations.

According to an embodiment, wherein generate the diagrammatic representation of the area based on the heat map of the sensor data comprises: obtaining the heat map based on an intensity of the sensor data and time period spent by the electronic device (100) in each of the locations; obtaining an edge detection kernel matrix in different orientation, wherein the edge detection kernel matrix is configured to identify edges of different orientation in the diagrammatic representation of the area, wherein ratio of maximum walkable value in each of the locations in the heat map and minimum walkable value in each of the locations in the heat map is determined as edge detection kernel center value for all matrices of different orientations; convoluting edge detection kernels in different orientations with the heat map to obtain various edge detection matrices, wherein each edge detection matrix is further used for identifying edges of particular orientation in the diagrammatic representation of the area, identifying at least one edge of the different orientation of in the diagrammatic representation of the area based on the convolution using a walkable threshold in edge detection matrix.

According to an embodiment, wherein generate the diagrammatic representation of the area based on the heat map of the sensor data comprises: obtaining the heat map based on an intensity of the sensor data and time period spent by the electronic device (100) in each of the locations; obtaining passage detection kernel in different orientations for identifying passages of different orientations in the diagrammatic representation of the area, wherein ratio of maximum walkable value in each of the locations in the heat map and minimum walkable value in each of the locations in the heat map is determined as passage detection kernel center value for all matrices of different orientations; convoluting passage detection kernels in different orientations with the heat map to obtain passage detection matrices, wherein each passage detection matrix is further used for identifying passages of particular orientation in the diagrammatic representation of the area; and identifying at least one passage of different orientation in the diagrammatic representation of the area based on the convolution using a walkable threshold in the passage detection matrix According to an embodiment, wherein identify the at least one passage of the at least one room in the diagrammatic representation of the area based on the convolution using the walkable threshold comprises: compare indices of at least one edge determined using the edge detection matrix with same indices of the passage detection matrix to identify at least one passage; and identify the at least one passage of the at least one room in the diagrammatic representation of the area based on the comparison.

According to an embodiment, wherein the passage detection kernel matrix and the passage detection kernel matrix are determined from different orientations, wherein values of the edge detection kernel matrix and the passage detection kernel matrix determined from various orientations are computed to determine the at least one passage and the at least one edges in the diagrammatic representation of the area.

According to an embodiment, wherein the walkable threshold in the edge detection matrices is determined by convoluting at least one of the edge detection kernel with the minimum walkable matrix.

According to an embodiment, wherein the walkable threshold in the passage detection matrices is determined by convoluting at least one of the passage detection kernel with the minimum walkable matrix.

According to an embodiment, wherein the sensor data is obtained using at least one of an accelerometer sensor (150), a barometer sensor (160), a magnetic sensor (170), a gyroscope sensor (180) and a rotation vector sensor (190).

According to an embodiment, wherein the accelerometer sensor (150) is utilized to estimate the step length by analysing the peak and valley data associated with the step length data, time difference between the peak and valley data associated with the step length data and accelerometer data pattern associated with the step length data by comparing peak and valley data, time difference between peak and valley data, accelerometer data pattern of current step data which is generated with every new step with the calibrated step peak and valley data, calibrated step time difference data and calibrated step data pattern captured during the calibration activity, while walking the user in the plurality of locations of the area.

According to an embodiment, wherein the barometer sensor (160) is utilized to detect a change in floor by determining relative difference in atmospheric pressure from a first location from the plurality of locations to a second location from the plurality of location.

According to an embodiment, wherein the barometer sensor (160) is utilized to update a reference atmospheric pressure and a reference height by monitoring a variance and standard deviation in atmospheric pressure data over short time period intervals, while walking the user in the plurality of locations of the area.

According to an embodiment, wherein the rotation vector sensor (190) and the accelerometer sensor (150) are utilized to determine a user heading direction relative to north direction irrespective of orientation of the electronic device (100) by analysing the accelerometer data in north-east-up world axis resulting in a user moving direction vector in north-east-up axis frame with the vector pointing in north direction provided from rotation vector sensor data, wherein the accelerometer data is converted from device frame axis to world frame axis using the rotation vector sensor data providing device orientation in world frame axis, while walking the user in the plurality of locations of the area.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an electronic device including a processor, a communicator and at least one sensor, the method comprising:
    obtaining sensor data over a plurality of locations of an area over a period of time by using the at least one sensor of the electronic device;
    generating a heat map based on an intensity of the sensor data and a time period spent by the electronic device in each of the locations of the area by using the processor of the electronic device;
    generating a diagrammatic representation of the area including location information of appliances based on the heat map of the sensor data by using the processor;
    sending, to a server, the diagrammatic representation of the area by using the communicator of the electronic device;
    tracking a user of the electronic device and the appliances in locations of the area by using the diagrammatic representation and the sensor data;
    determining, based on the tracking of the user of the electronic device in the area, that the user of the electronic device is within a predetermined location of the area;
    displaying the diagrammatic representation of the area on a display of the electronic device; and
    based on the determination, controlling at least one appliance in the predetermined location by using the communicator to trigger an event that changes the settings of the at least one appliance;
    wherein the generating the diagrammatic representation comprises:
    obtaining edge detection kernel matrices in different orientations and passage detection kernel matrices in different orientations based on the heat map, wherein a ratio of a maximum walkable value in each of the locations in the heat map and a minimum walkable value in each of the locations in the heat map is determined as an edge detection kernel center value for the edge detection kernel matrices and a passage detection kernel center value for the passage detection kernel matrices of the different orientations;
    convoluting the edge detection kernel matrices and the passage detection kernel matrices with the heat map;
    obtaining edge detection matrices and passage detection matrices based on the convolution; and
    identifying at least one edge and at least one passage of a particular orientation in the diagrammatic representation of the area based on convolution using a walkable threshold in the edge detection matrices and the passage detection matrices, wherein the walkable threshold is determined based on the edge detection kernel matrices and the passage detection kernel matrices;
    wherein the location information of the appliances on the diagrammatic representation is determined based on initial registration information and user action information for actions taken on the appliances over a period of time;
    wherein the initial registration information includes identifiers (IDs) of the appliances, user-defined location names, and an initial location of each of the appliances based on a user input;
    and wherein the user action information obtained by the tracking of the user is used for learning relationships between the user-defined location names of the diagrammatic representation and the relative locations of each of the appliances.

2. The method of claim 1, further comprising:
    receiving a usage of at least one appliance in the diagrammatic representation of the area over a period of time;
    classifying spaces in the diagrammatic representation by determining a relationship between a user-defined location name and a relative position of the at least one appliance using a machine learning procedure; and
    placing the at least one appliance in the diagrammatic representation of the area.

3. The method of claim 1, wherein generating the heat map of the sensor data of each of the locations of the area comprises:
    determining an intensity of the sensor data based on a number of times the sensor data is received of each of the locations;
    determining a time period spent by the electronic device in each of the locations; and
    generating the heat map based on the intensity of the sensor data and the time period spent by the electronic device in each of the locations.

4. The method of claim 1, wherein identifying the at least one edge and the at least one passage in the diagrammatic representation comprises:
    comparing indices of at least one edge determined using an edge detection matrix with the same indices of a passage detection matrix to identify at least one passage; and
    identifying the at least one passage in the diagrammatic representation of the area based on the comparison.

5. The method of claim 1, wherein each edge is determined for a different orientation, wherein values of the edge detection kernel matrices are computed to identify the at least one edge in the diagrammatic representation of the area.

6. The method of claim 1, wherein the sensor data is obtained using at least one of an accelerometer sensor, a barometer sensor, a magnetic sensor, a gyroscope sensor and a rotation vector sensor.

7. The method of claim 6, wherein the accelerometer sensor is utilized to estimate a step length by analyzing; peak and valley data associated with the step length data, a time difference between the peak and valley data associated with the step length data, and an accelerometer data pattern associated with the step length data; wherein the analysis is performed by comparing the peak and valley data, the time difference between the peak and valley data, and the accelerometer data pattern associated with current step data generated with every new step with calibrated step peak and valley data, calibrated step time difference data, and calibrated step data pattern captured during a calibration activity.

8. The method of claim 6, wherein the barometer sensor is utilized to detect a change in floor by determining relative difference in atmospheric pressure from a first location from the plurality of locations to a second location from the plurality of locations; and
wherein the barometer sensor is utilized to update a reference atmospheric pressure and a reference height by monitoring a variance and standard deviation in atmospheric pressure data over time period intervals.

9. The method of claim 6, wherein the rotation vector sensor and the accelerometer sensor are utilized to determine a user heading direction relative to the north direction irrespective of orientation of the electronic device by analyzing the accelerometer data in a north-east-up world axis resulting in a user moving direction vector in the north-east-up axis frame to compare it with the vector pointing in the north direction provided from the rotation vector sensor data, and
wherein the accelerometer data is converted from a device frame axis to a world frame axis using the rotation vector sensor data providing device orientation in the world frame axis.

10. An electronic device comprising:
at least one sensor;
a communicator;
a memory;
a processor, operatively coupled with the memory, the communicator and the at least one sensor, the processor configured to:
obtain sensor data over a plurality of locations of an area over a period of time by using the at least one sensor of the electronic device;
generate a heat map based on an intensity of the sensor data and a time period spent by the electronic device in each of the locations of the area by using the processor of the electronic device;
generate a diagrammatic representation of the area including location information of appliances based on the heat map of the sensor data by using the processor;
send, to a server, the diagrammatic representation of the area by using the communicator of the electronic device;
track a user of the electronic device and the appliances in locations of the area by using the diagrammatic representation and the sensor data;
determine, based on the tracking of the user of the electronic device, that the user of the electronic device is within a predetermined location of the area;
display the diagrammatic representation of the area on a display of the electronic device; and
based on the determination, control at least one appliance in the predetermined location by using the communicator to trigger an event that changes the settings of the at least one appliance;
wherein the processor is further configured to:
obtain edge detection kernel matrices in different orientations and passage detection kernel matrices in different orientations based on the heat map, wherein a ratio of a maximum walkable value in each of the locations in the heat map and a minimum walkable value in each of the locations in the heat map is determined as an edge detection kernel center value for the edge detection kernel matrices and a passage detection kernel center value for the passage detection kernel matrices of the different orientations;
convolute the edge detection kernel matrices and the passage detection kernel matrices with the heat map;
obtain edge detection matrices and passage detection matrices based on the convolution; and
identify at least one edge and at least one passage of a particular orientation in the diagrammatic representation of the area based on convolution using a walkable threshold in the edge detection matrices and the passage detection matrices, wherein the walkable threshold is determined based on the edge detection kernel matrices and the passage detection kernel matrices,
wherein the location information of the appliances on the diagrammatic representation is determined based on initial registration information and user action information for actions taken on the appliances over a period of time;
wherein the initial registration information includes identifiers (IDs) of the appliances, user-defined location names, and an initial location of each of the appliances based on a user input;
and wherein the user action information obtained by the tracking of the user is used for learning relationships between the user-defined location names of the diagrammatic representation and the relative locations of each of the appliances.

11. The electronic device of claim 10, wherein the processor is further configured to:
receive a usage of at least one appliance in the diagrammatic representation of the area over a period of time;
classify spaces in the diagrammatic representation by determining a relationship between a user-defined location name and a relative position of the at least one appliance using a machine learning procedure; and
place the at least one appliance in the diagrammatic representation of the area.

12. The electronic device of claim 10, wherein the processor is, in order to generate the heat map of the sensor data of each of the locations of the area, configured to:
determine an intensity of the sensor data based on a number of times the sensor data is received of each of the locations;
determine a time period spent by the electronic device in each of the locations; and
generate the heat map based on the intensity of the sensor data and the time period spent by the electronic device in each of the locations.

* * * * *